United States Patent
Armstrong et al.

(10) Patent No.: US 10,667,023 B2
(45) Date of Patent: May 26, 2020

(54) STEAM/HOT WATER MONITORING AND CONTROL SYSTEM

(71) Applicant: ARMSTRONG INTERNATIONAL, INC., Three Rivers, MI (US)

(72) Inventors: Kurt Armstrong, Laguna Beach, CA (US); Thomas Jack Secord, Union City, MI (US)

(73) Assignee: ARMSTRONG INTERNATIONAL, INC., Three Rivers, MI (US)

( * ) Notice: Subject to any disclaimer, the term of this patent is extended or adjusted under 35 U.S.C. 154(b) by 91 days.

(21) Appl. No.: 15/160,522

(22) Filed: May 20, 2016

(65) Prior Publication Data

US 2016/0345082 A1 Nov. 24, 2016

Related U.S. Application Data

(60) Provisional application No. 62/165,060, filed on May 21, 2015.

(51) Int. Cl.
*H04Q 9/00* (2006.01)

(52) U.S. Cl.
CPC .......... *H04Q 9/00* (2013.01); *H04Q 2209/10* (2013.01); *H04Q 2209/40* (2013.01)

(58) Field of Classification Search
CPC combination set(s) only.
See application file for complete search history.

(56) References Cited

U.S. PATENT DOCUMENTS

| | | | |
|---|---|---|---|
| 4,086,809 | A | 5/1978 | Wu et al. |
| 5,992,436 | A | 11/1999 | Hellman et al. |
| 6,145,529 | A | 11/2000 | Hellman et al. |
| 6,283,138 | B1 | 9/2001 | Friend et al. |

(Continued)

FOREIGN PATENT DOCUMENTS

WO 2016056292 A1 4/2016

OTHER PUBLICATIONS

Robert Poor, Networksstandards & Protocols, Wireless Mesh Networks, Sensors Magazine, Feb. 1, 2003, http:/www.sensorsmag.com/networking-communications/standards-protocols/wireless-mesh . . . , 8 Pages.

(Continued)

*Primary Examiner* — Amine Benlagsir
(74) *Attorney, Agent, or Firm* — Dickinson Wright PLLC; Steven Hurles

(57) ABSTRACT

Systems and methods for continually measuring and calculating performance of a hot water or a system are described. A central monitor receives and processes information from hot water or steam field devices. A mobile device can communicate with the central monitor and display processed data from the central monitor regarding field devices associated with the mobile device. The central monitor can determine and send control parameters, maintenance reminders and other information to the mobile device or to a monitor at an enterprise location. Data is sent to the mobile device from the central monitor when there is a quality communication connection. If the mobile device is in the field with a poor or no communication connection, it stores updates and pushes the changes to the control monitor when a quality communication connection is reestablished.

18 Claims, 19 Drawing Sheets

(56) References Cited

U.S. PATENT DOCUMENTS

| | | | |
|---|---|---|---|
| 6,338,283 | B1 | 1/2002 | Navarro et al. |
| 6,484,109 | B1 | 11/2002 | Lofall |
| 6,675,665 | B2 | 1/2004 | Navarro et al. |
| 7,013,223 | B1 | 3/2006 | Zhang et al. |
| 7,203,626 | B2 | 4/2007 | Quake et al. |
| 7,246,036 | B2 | 7/2007 | Cheskaty et al. |
| 8,756,977 | B2 | 6/2014 | Ramadas et al. |
| 9,036,892 | B2 | 5/2015 | Domke et al. |
| 9,835,594 | B2 | 12/2017 | Yoskovitz et al. |
| 9,971,667 | B1 | 5/2018 | Jenkins et al. |
| 2002/0029808 | A1 | 3/2002 | Friend et al. |
| 2002/0120422 | A1 | 8/2002 | Nagase |
| 2004/0122602 | A1 | 6/2004 | Nagase |
| 2004/0236620 | A1* | 11/2004 | Chauhan ............... G06Q 10/06 705/7.14 |
| 2005/0066730 | A1 | 3/2005 | Raichle |
| 2005/0096873 | A1 | 5/2005 | Klein |
| 2006/0122808 | A1 | 6/2006 | Quake et al. |
| 2006/0122810 | A1 | 6/2006 | Clarke et al. |
| 2006/0176169 | A1 | 8/2006 | Doolin et al. |
| 2007/0208236 | A1 | 9/2007 | Hicks |
| 2007/0299575 | A1 | 12/2007 | Yamada et al. |
| 2009/0090186 | A1 | 4/2009 | Linzenkirchner et al. |
| 2009/0192653 | A1 | 7/2009 | Songukrishnasamy et al. |
| 2011/0031323 | A1* | 2/2011 | Nold .................. G05B 19/0428 236/20 R |
| 2011/0203684 | A1 | 8/2011 | Ramadas et al. |
| 2011/0295561 | A1* | 12/2011 | Nagase .............. G05B 19/4183 702/188 |
| 2011/0316707 | A1 | 12/2011 | Gaines et al. |
| 2012/0324119 | A1* | 12/2012 | Imes ...................... H04L 67/42 709/227 |
| 2013/0049984 | A1 | 2/2013 | Harper, Jr. |
| 2013/0288647 | A1* | 10/2013 | Turgeman ............. H04W 12/06 455/411 |
| 2014/0090712 | A1* | 4/2014 | Karschnia ................ F16T 1/48 137/1 |
| 2015/0039250 | A1 | 2/2015 | Rank |
| 2016/0019278 | A1* | 1/2016 | Jadhav ................ H04L 67/1095 707/624 |
| 2017/0122551 | A1* | 5/2017 | Ihara ...................... F22B 35/00 |

OTHER PUBLICATIONS

Louis E. Fenzel, A Dozen Top Applications for Mesh Networks, Dated Sep. 15, 2005, Copyright 2006, Penton Media, Inc., http://electronicdesign.com/Articles/Print.cfm?ArticleID=10979, 3 Pages.

Honeywell Onewireless Mesh Network Now Available to Improve Plant Safety, Reliability, Dated Jun. 11, 2007, Publication: Business Wire, http://www.thefreelibrary.com/_/print/PrintArticle.aspx?id=164751236, 2 Pages.

Wireless HART—The New Interoperable Wieress Communication Standard for the Process Industries, Copyright HART Communication Foundation 2007, 9 Pages.

Accutech Wireless Instrumentation Acoustic Product Description Oct. 22, 2004, http://www.savewithaccutech.com, 2 Pages.

* cited by examiner

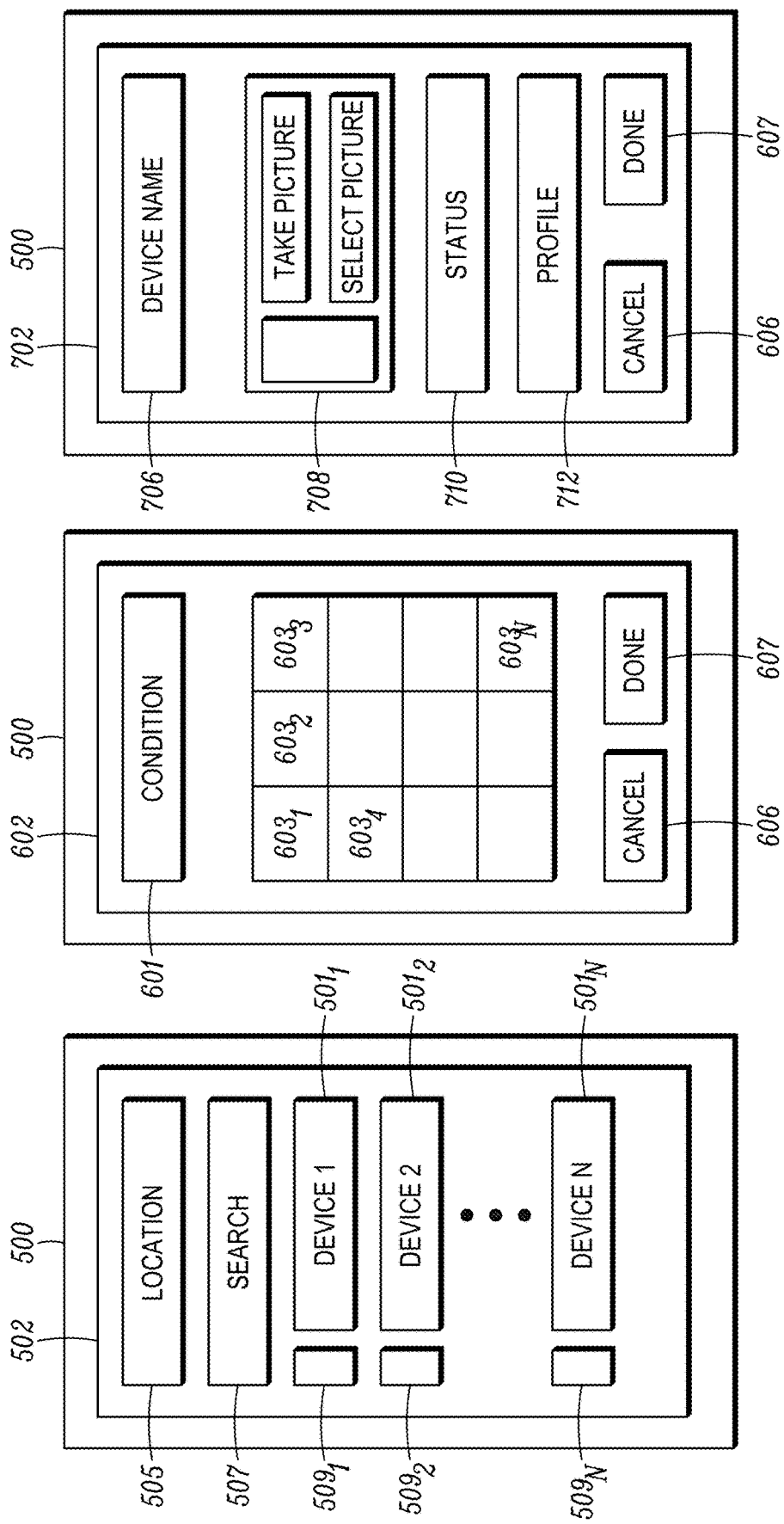

STEAM/HOT WATER MONITORING AND CONTROL SYSTEM

The present application claims the benefit of U.S. Provisional Patent Application Ser. No. 62/165,060, filed 21 May 2015, the contents of which are hereby incorporated by reference.

TECHNICAL FIELD

This invention relates to a system and method for monitoring and managing a steam or hot water system and providing communication to mobile devices.

BACKGROUND

Steam is used as a source of power in a variety of applications, including steam generators and steam turbines. Steam is used for heating, sterilizing, humidifying, and evaporating in several sectors such as oil refining, nuclear power plants, and food plants, as well as pharmaceutical manufacturing plants. The components that use steam and hot water should be monitored for performance. Until now such monitoring required human intervention for a manual inspection and reporting findings either in-person or via written reports. Such a manual process may not be fully reliable, is time consuming and may pose a risk (for example, risk of burning while installing the connections for the sampling or while taking the samples). Moreover, such historical manual measurements do not provide real-time information regarding the system.

SUMMARY

The disclosed system and method continually and automatically measures the status of elements in the steam/hot water system. The system can aggregate the data from devices in the steam system or the hot water system. This data is processed to produce an output. The output can provide data on a global basis about the system and on a device level. The output can be shared with mobile device in the field at locations associated with the steam system or the hot water system.

A hot water or steam monitoring system may include a central monitor to receive and process information from hot water or steam field devices and a plurality of mobile devices in communication with the central monitor. The mobile devices being adapted to display processed data from the central monitor regarding field devices associated with at least one of the plurality of mobile devices.

In an example, the mobile device includes a history of the associated field devices downloaded from the central monitor.

In an example, the mobile device uses a first gesture to select a field device from a plurality of field devices loaded into the at least one mobile device, a second gesture, which is different from the first gesture, to receive data regarding the selected field device, and a third gesture, which is different from the first gesture and the second gesture, to add new field devices to an enterprise location.

In an example, the mobile device uploads the new field device information to the central monitor, wherein at least one of the first gesture and the second gesture is not a single tap on a graphical user interface of the at least one mobile device.

In an example, the central monitor issues control signals to the field devices to set operational parameters of the field devices.

In an example, the central monitor issues control signals to the mobile device to set operational parameters of the field devices.

In an example, the central monitor calculates an efficiency value for a field device using information from hot water or steam field devices and displays the efficiency history of the field device.

In an example, the central monitor displays a visual indicator of a current efficiency of the field device.

In an example, the central monitor transmits data for a visual indicator to the mobile device for the mobile device to display a mobile device indicator on a graphical user interface.

In an example, the central monitor calculates an efficiency value for a group of the field devices using information from hot water or steam field devices and displays the efficiency history of the group of field devices.

In an example, the central monitor displays a visual indicator of a current efficiency of the group of field devices or transmits data for a visual indicator to the mobile device for the mobile device to display a mobile device indicator on a graphical user interface for the group of field devices.

In an example, the central monitor downloads data for a first field device of the hot water or steam field devices to the mobile device when the mobile device is scheduled to review the field device, wherein the data of the first field device includes historical operational data, an image of the first field device, and a status indicator.

In an example, the mobile device includes an inspection schedule for a plurality of the field devices, and wherein the central monitor downloads stored data for each of the plurality of field device to the mobile device, the stored data includes images of each of the field devices, location of each of field devices, a route to inspect the plurality of field devices, and the determined operational state of each of the field devices.

An embodiment of a hot water or steam monitoring system includes a central monitor to receive and process information from hot water or steam field devices. The system further includes a plurality of mobile devices in communication with the central monitor when having a communication channel with the central monitor, wherein the mobile devices are configured to update data regarding field devices in a hot water or steam processing environment, the mobile devices providing a graphical user interface with data regarding the field devices and allow for the update of the field device data on a device by device basis, and wherein the mobile device is configured to push changed data to the central monitor when the mobile device returns to a physical location with the communication to the central monitor being reestablished.

In an example, the communication between the central monitor and the mobile devices is a wireless communication.

In an example, the central monitor is configured to send a past status of the field devices to an assigned mobile device of the plurality of mobile devices. The assigned mobile device receives the past status of the field devices before the assigned mobile device is to be used to inspect the field devices assigned to the assigned mobile device. The graphical user interface displays the past status for the assigned field devices and allows a user to traverse data regarding a group of field devices and an individual selected field device in the group of field devices.

In an example, the central monitor downloads data for a field device of the field devices to the mobile device when one of the plurality of mobile devices is scheduled to review the field device, wherein the data of the first field device includes historical operational data, an image of the first field device, and a status indicator.

In an example, the central monitor downloads a virtual map of the field devices to be reviewed using one mobile device of the plurality of mobile devices, wherein data for the field devices along a route to be followed by the one mobile device is stored in the one mobile device, and the graphical user interface of the one mobile device displays select ones of the field devices as selected through the graphical user interface.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the present disclosure described herein are recited with particularity in the appended claims. However, other features will become more apparent, and the embodiments may be best understood by referring to the following detailed description in conjunction with the accompanying drawings, in which:

FIG. 5 is a view of a mobile device according to an embodiment;

FIG. 6 is a view of a mobile device according to an embodiment;

FIG. 7 is a view of a mobile device according to an embodiment;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
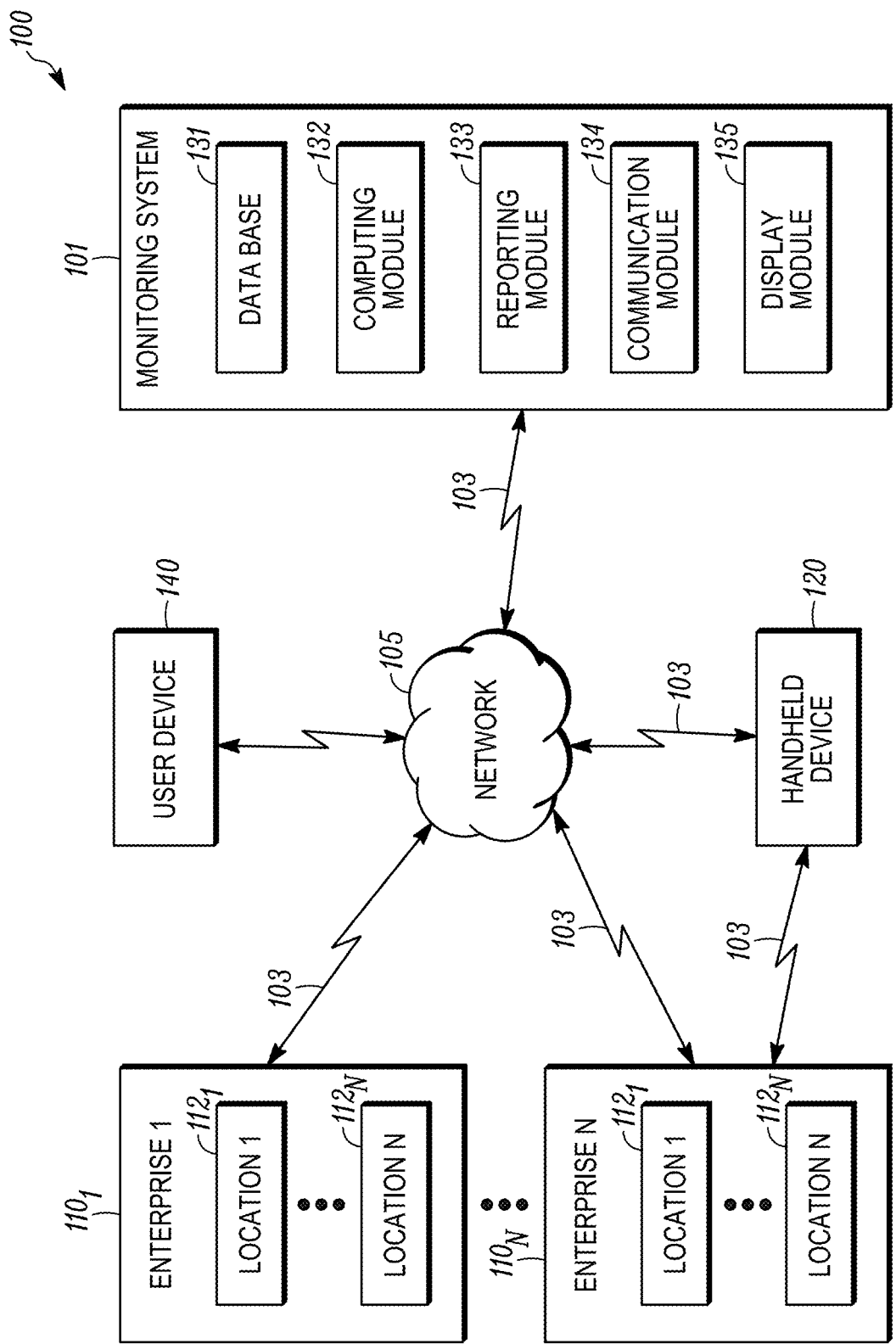
FIG. 1 is a schematic diagram of an embodiment of the disclosed system.

Referring to Figure (FIG. 1, an example monitoring system 100, within which steam/hot water monitoring, reporting and controlling can be implemented. The example monitoring system 100 includes a central monitor 101 in communication via data communication to a network 105. Enterprises 110 (individual ones of the enterprises are designated with a subscript 1 . . . N) are entities that employ various field devices that control, monitor, and supply steam and/or hot water to produce goods, thermal energy, heat or the like. Examples of enterprises include, but are not limited to, food and beverage processing plants, institutional campus, pharmaceutical plants, refineries, power plant and the like. Such large scale enterprises 110 may have a plurality of locations 112 (individual ones of the locations are designated with a subscript 1 . . . N). Each of the locations 112 may include a plurality of devices, each of which may be monitored and controlled. Monitoring may be performed as described in U.S. patent application Ser. No. 12/824,326, which is hereby incorporated by reference. Data regarding steam or hot water devices may be sensed at the device and sent to the central monitor 101 via a network. Additionally, data may be sent from the central monitor 101 to the device. A mobile device (e.g., a handheld) 120 is provided and can communicate with either the location 112 of an enterprise 110 or with the enterprise directly. The mobile device 120 (e.g., a handheld) can also communicate with any of the locations 112, enterprises 110 or with the central monitor 101 using data communication 103 with the network 105. The mobile device 120 may also interact directly with the field devices at a location 112 of the enterprise. The device 120 may read the operating parameters, operating conditions, or the sensed data at the field device. The field device may be designated by an identification code that is distinct from other field devices.

In an example, the monitoring system can remotely monitor multiple hot water and/or steam field devices, e.g., hot water valves, mixers, steam traps and the like, at an enterprise 110. Each field device includes a monitor comprising one or more sensors for sensing selected operating conditions of the device trap, and a programmable controller operatively connected to receive the outputs of each of the sensors, convert the sensor outputs into one or more data signals corresponding to the sensed conditions. The device controller transmits the data signals, directly or indirectly, to a central monitor 101 or to the components of the monitoring system 100 remote from the field device. The central monitor includes a receiver and logic for evaluating the data received from the field device to thereby monitor the condition of the field devices, e.g., hot water devices or steam devices, such as steam traps. At least some of the field device also include a local receiver adapted to receive data signals transmitted from other field device monitors and re-transmit the received data so that remote monitors otherwise outside the direct receiving range of the central monitor or communication network to the remote monitoring system are received by the remote monitoring system. In an example, the mobile device 120 reads the data from the field device and sends to the central monitor 101. In an example, the mobile device 120 provides additional data about the field device and may receive input data, e.g., through a graphical user interface, that is then sent to the central monitor 101.

Data communication 103 as described herein, e.g., FIG. 1 couples the various systems and devices together. The network 105 may be a global computer network, e.g., the Internet, but can be any network capable of communicating data between devices. In addition to the Internet, suitable networks can also include or interface with any one or more of, for instance, an local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications can also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, an IEEE 802.11-based radio frequency network or an IEEE 802.15-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The central monitor 101 can be a computer system with circuitry, logic, memory and at least one processor to receive, to process and to display information received through the network 105 regarding the operation of field devices at the locations 112. The central monitor 101 is dedicated to the processing of hot water or steam related information from the field device and input to control the field devices or operations at the locations of the enterprises. In an example, the data can be from the mobile device 120. The central monitor 101 includes a database 131 to store data, either related to status of devices at the locations 112 or computed data from the status of devices at the locations 112. A computing module 132 processes the received data to produce computed data, which can both be saved in the database 131. A reporting module 133 can generate reports, either electronic (editable or pdf formatted) or paper, by formatting data from the database and optionally receiving data from the computing module to produce a report in real-time. Real-time in the context of reports regarding device, group, nest, location or enterprise performance may be based on a change of data received at the monitoring system, e.g., when the received data changes a calculated value. In other examples, the report can be run at a time of day or at a scheduled time. The report can be based on the enterprise level, which can include selected locations 112 and/or selected devices at the locations 112. The reporting module 133 can generate reports at the location 112 level with selected devices from the particular location 112. A nest of field devices can like devices at a particular location. A group of devices may be devices within a sub-location at a location. A communication module 134 operates to allow the central monitor 101 to receive data over the network 105 from the enterprises, the location, or individual devices, either directly or from the mobile device 120. Display module 135 operates to produce formatted data for display to a user. The formatted data may be presented on an external display screen, e.g., a computer monitor, a television, a mobile device. Each module may include circuitry, e.g., processors, logic, and memory, to execute instructions on sensed data or calculated data.

Figure 2:
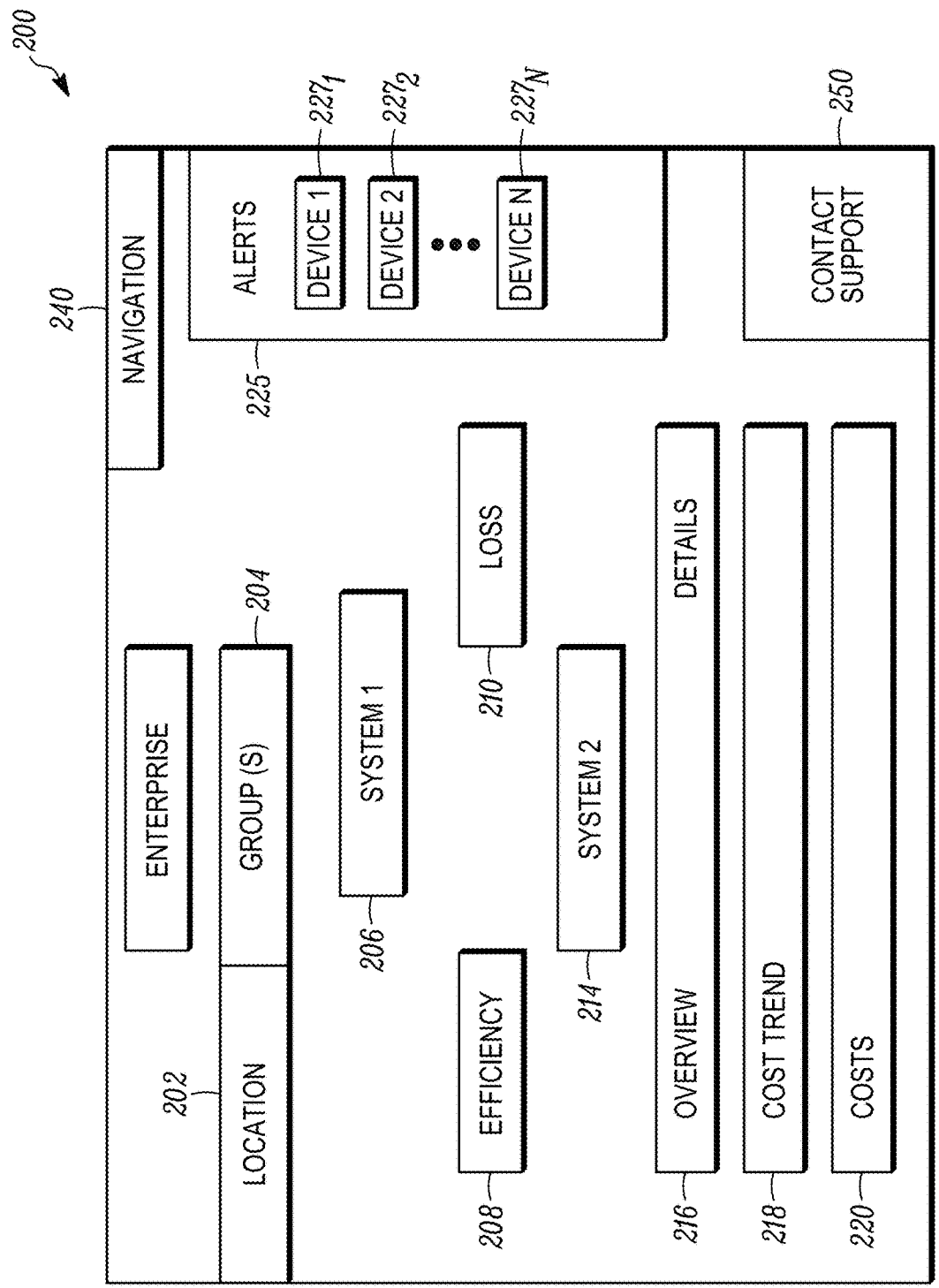
FIG. 2 is a view of a display as generated by the present system according to an embodiment.

FIG. 2 shows a dashboard 200 of received data and computed data related to any one or combination of an enterprise 110, a location 112 or a device. The dashboard 200 can be produced by the display module 135 and optionally with other modules of the central monitor 101 (FIG. 1). The dashboard 200 can be on a monitor that is part of or in communication with the central monitor 101 (FIG. 1). The dashboard 200 includes a location field 202 that is used to designate the highest level of reporting and data analysis. A location can be part of an enterprise, which itself can be an account holder using the system. An enterprise field can show who is logged into the system and allows the enterprise to include the locations linked to the enterprise. A group field 204 is used to select a group or groups within the location of the enterprise. A location may have one or more groups, each of these groups are available for selection in field 204 when that location is selected. The dashboard 200 may also have a nest field is used to select a nest or nests of field devices within the location of the enterprise. A location may have one or more nests, each of these nests are available for selection in a field, similar to field 204, when that location is selected. A system field 206 is used to select what system or systems at the selected location and selected enterprise that is being computed and displayed. At least one system is selected in the field 206 for data analysis. At times, a plurality of systems is selected at field 206. The systems available for selection at field 206 are limited to those at the selected group(s) in field 204.

At fields 208 and 210, calculated values of efficiency and loss are displayed. The efficiency can be calculated by the central monitor 101 (FIG. 1), which may be dedicated to receipt of data, storage or data and computing of data for this purpose. The efficiency field 208 value can be calculated from an algorithm that is stored in the database and run on a processor. The efficiency value may be the indication of the percent of devices that meet can acceptable level performance. Other indications of efficiency may be used, ratios or raw numbers. The efficiency field 208 may further include an indicator that visually shows the relative status with regard to efficiency. For example, a color may be used to display the efficiency value that indicates its relative status. With the efficiency value below a lowest threshold (e.g., 50%), the value in the efficiency field can be displayed in a first color (e.g., red) to indicate more urgent attention needed. With the efficiency value above a lowest threshold (e.g., 50%) and below high threshold (e.g., 80%), the value in the efficiency field can be displayed in a second color (e.g., yellow). With the efficiency value above the higher threshold (e.g., 80%), the value in the efficiency field can be displayed in a third color (e.g., green) to indicate that the system is functioning in an acceptable efficiency. Any of the thresholds can be changed in the monitoring system 121, which may result in different displays in the efficiency field 208. The thresholds can be changed for each location or each enterprise being monitored by monitoring system 101. Other indicators can also be used, e.g., highlighting or blinking, to draw attention to the efficiency value in the field 208. The indicators can be graphical elements that are part of a graphical user display. In an example, the indicators can be emoticons. The indicators can also be at the threshold where the field device, the group of field devices, or nest of field devices crosses a threshold value.

If the monitoring system 121 is monitoring a hot water system, then the thresholds for the indicators can be (a) greater than 90 percent of the set temperature is indicated as good (e.g., green, no color or happy emoticon); (b) greater than 80 percent to 90 percent of the set temperature is indicated as mid-level (e.g., yellow or a neutral emoticon); and (c) less than 80 percent of the set temperature is indicated a bad (e.g., red, orange or an angry or sad emoticon). The thresholds can also be a plus or a minus in degrees from the set temperature. The set temperature may be sensed at the mixed outlet supply of the hot water system.

The loss field 210 shows a calculated value from the central monitor 101. The calculated value shows an estimated monetary loss based on the current operating condition of the system 206, group 204 and/or location 202. The loss field may be used to display calculated losses in a monitored steam system. In an example, the central monitor 101 calculates the pounds of steam being lost per a unit of time (e.g., day or hour) and multiplies that by the cost to generate a pound (or kilogram or other unit of mass or weight) of steam over the unit of time. This results in a monetary value displayed in the loss field. Like the efficiency field 208, the loss field 210 may display it monetary value with an indicator that shows where the system, location or enterprise is at on a scale of loss due to the current status of the devices in the system, location or enterprise, or combinations thereof. For example, a color may be used to display the loss value that indicates its status relative to a scale that can be stored in the monitoring system's database 131. With the loss value above a high threshold (e.g., $1,000), the value in the loss field 210 can be displayed in a first color (e.g., red) to indicate more urgent attention needed. With the loss value below the high threshold (e.g., $1000) and above a low threshold (e.g., $500), the value in the loss field 210 can be displayed in a second color (e.g., yellow). With the efficiency value below the lower threshold (e.g., $500), the value in the loss field can be displayed in a third color (e.g., green) to indicate that the system is functioning in an acceptable loss. Any of the thresholds can be changed in the monitoring system 121, which may result in different displays in the loss field 210. The thresholds can be changed for each location or each enterprise being monitored by monitoring system 101. Other indicators can also be used, e.g., highlighting or blinking, to draw attention to the loss value in the field 210.

The hot water system operates at an operating temperature and an operating pressure. The field device or the mobile device, which may include a probe, transmits the measured real-time temperature and real-time pressure to the control monitor. The control monitor can assess and interpret the transmitted potential to determine whether the operating condition of the field device or the system containing the field device conforms to operating conditions, which can be stored in the control monitor. If the operating conditions of the filed device or system, as determined by the control monitor, does not conform with stored parameters at the control monitor, the control monitor is operable to transmit instructions to alter operational parameters of the field device in the hot water system. The field device can receive the updated operational parameters from the control monitor, from control devices at the location, or manually from a user that is using the mobile device.

The dashboard 200 includes additional systems being displayed at field 214. Field 214 indicates the system that has its overview and operational details shown in field 216. The field 214 may be used to display a hot water system along with it associates data and calculations. The additional system field 214 can indicated a different type of system that shown in system field 206. The system shown in field 214 may not be part of the efficiency field 208 or the loss field 210. For example, the system field 206 may be directed to a steam system and system field 214 may be directed to a different system, either in location or type (e.g., a hot water system, humidification system). The field 216 can include information relating to the type of system, its name, its current status, and a link to display additional details regarding the system. The additional details can be the current temperatures of water in a hot water system or the current settings in the system. Details can also include information on maintenance and devices in the system displayed in field 214.

The dashboard 200 includes a cost trend field 218 that can display costs trends for any of the system, location or enterprise levels. The cost trend can be a graph that shows the costs of operating the system, location or enterprise over a time period. Examples include a graph showing the cost over the past year in monthly data points or over a past month with daily data points. A graph showing the daily cost with hourly data points can also be generated. The cost trend can be calculated for display by the monitoring system 101.

The dashboard 200 includes a cost field 220 that can display cost for any of the system, location or enterprise levels. The cost in the cost field 220 can include the number values for the performance of the system, location, or enterprise, or other collection of devices. Examples of values displayed in the cost field include, but are not limited to, steam loss in pounds, kilograms or other mass/weight measure (total over life or over a time period), fuel used to generate the steam being lost, pollutants (e.g., $CO_2$ emission) due to steam loss, a savings potential if the devices or systems that include devices underperforming are replaced or serviced.

An alerts field 225 is provided by dashboard 200. The alerts field can display device values 227 that related to devices being used in the enterprise, location, group, or system that is subject to the dashboard and may be part of the calculations being used to generate the values being displayed, e.g., in the efficiency field 208, loss field 210, cost trend field 218 or costs field 220. The device values 227 can be one or more values (1, 2, . . . N, which are used as subscripts in the reference numbers for ease of illustration). The device values 227 can include, but are not limited to, the identifier of the device, a nest identifier and a group identifier, as well as an indicator of its status. The nest identifier indicates a collection of device in the location based on the user's needs, e.g., all of the buildings or otherwise related together. The group identifier indicates the type of device or type of system in which the device is associated. The use of groups and nests can improve the calculation of reports for the user. The status indicator can include an indicator that the device itself is in need of priority attention (e.g., maintenance, service or replacement), in need of attention (e.g., maintenance, service or replacement) or operating within acceptable parameters (not in need of current attention). In an example, priority attention is of a more urgent nature than just attention. The indicator can be a color bar, color display of the entire alert 227, icons, emojis, or other indicators. In an example, the device values 227 can be sorted such that the urgent attention devices are grouped together, e.g., at the top or at the bottom of the alert field 225. The attention device values are grouped together, e.g., adjacent the urgent attention devices.

A navigation field 240 is provided on dashboard 200 to allow the user to navigate to different displays or change the data being displayed. The navigation field 240 can include links to show specific equipment, run reports, go to a learning module, or otherwise change computer related settings.

A contact field 250 can be provided on dashboard 200 and includes contact information to the user viewing dashboard 200 to contact customer support or other company supporting the present monitoring system.

The fields in the dashboard 200 can be selected to change the view of the dashboard to display a graphical users interface that shows more data about the selected field than is shown in the home graphical user interface of the dashboard. Thus, a user may navigate between the graphical user interfaces on the dashboard to see expanded information about a field device, a location, a group, a nest or an enterprise. The dashboard 200 may also be sent to the mobile device to produce the associated graphical user interface.

Figure 3:
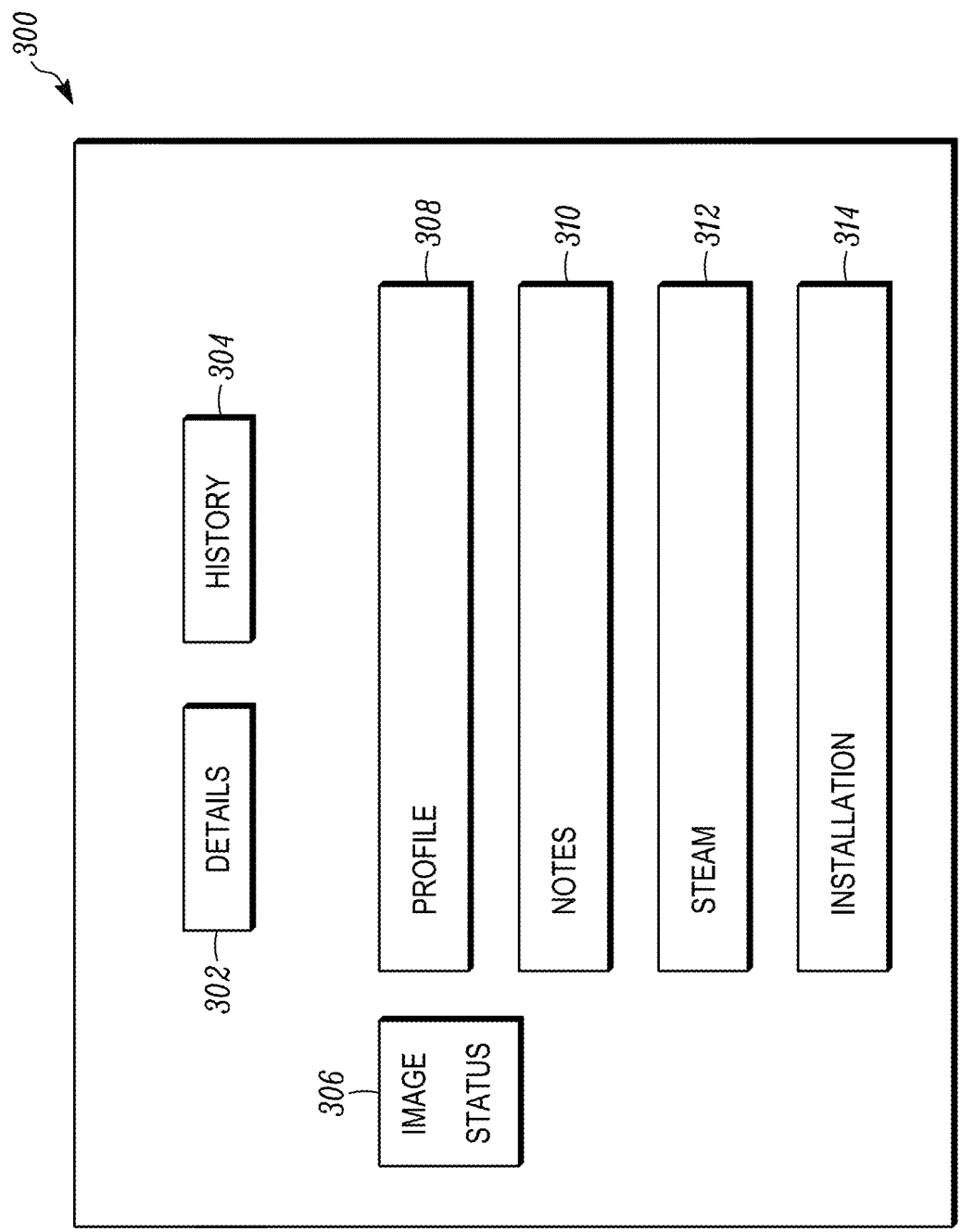
FIG. 3 is a view of a display as generated by the present system according to an embodiment.

FIG. 3 shows a display 300 for a selected device that is at a location 112 in an enterprise 110. The display 300 includes navigation buttons 302, 304 to navigate to a details display and a history display, respectively. The details display can show details regarding any of the devices. The history display can access and display historical data relating to a device. The history button will show all changes to the device, e.g., when the status changes, when any entry into the history is selected all data at that point in the time is displayed. An image and status identifier field 306 shows an image of the device, which can be a stock image of that device or an actual image taken of the device at its installation at the location. The field 306 can also show the current status of the device. The current status can be any of the statuses described herein, for example, good, attention or urgent attention. The status can also include visual indicators, e.g., color, flashing, etc., to further emphasize the status of the device. A profile field 308 can display stored profile information for the selected device, e.g., an identifier, a physical location, a last data survey date, manufacturer information, grouping, service date, time in service, a model identifier, survey frequency and any other information particular to that device. The profile field can also include data relating to how the device communicates with the monitoring system 101. A survey can be when data has been recorded from the device. A survey can be real-time or at intervals. The intervals can be daily or longer. A noted field 310 allows a user to enter comments regarding a device. A steam field 312 shows the steam related data for the device. An installation field 314 shows when the device was installed in the system and came on-line.

Figure 4:
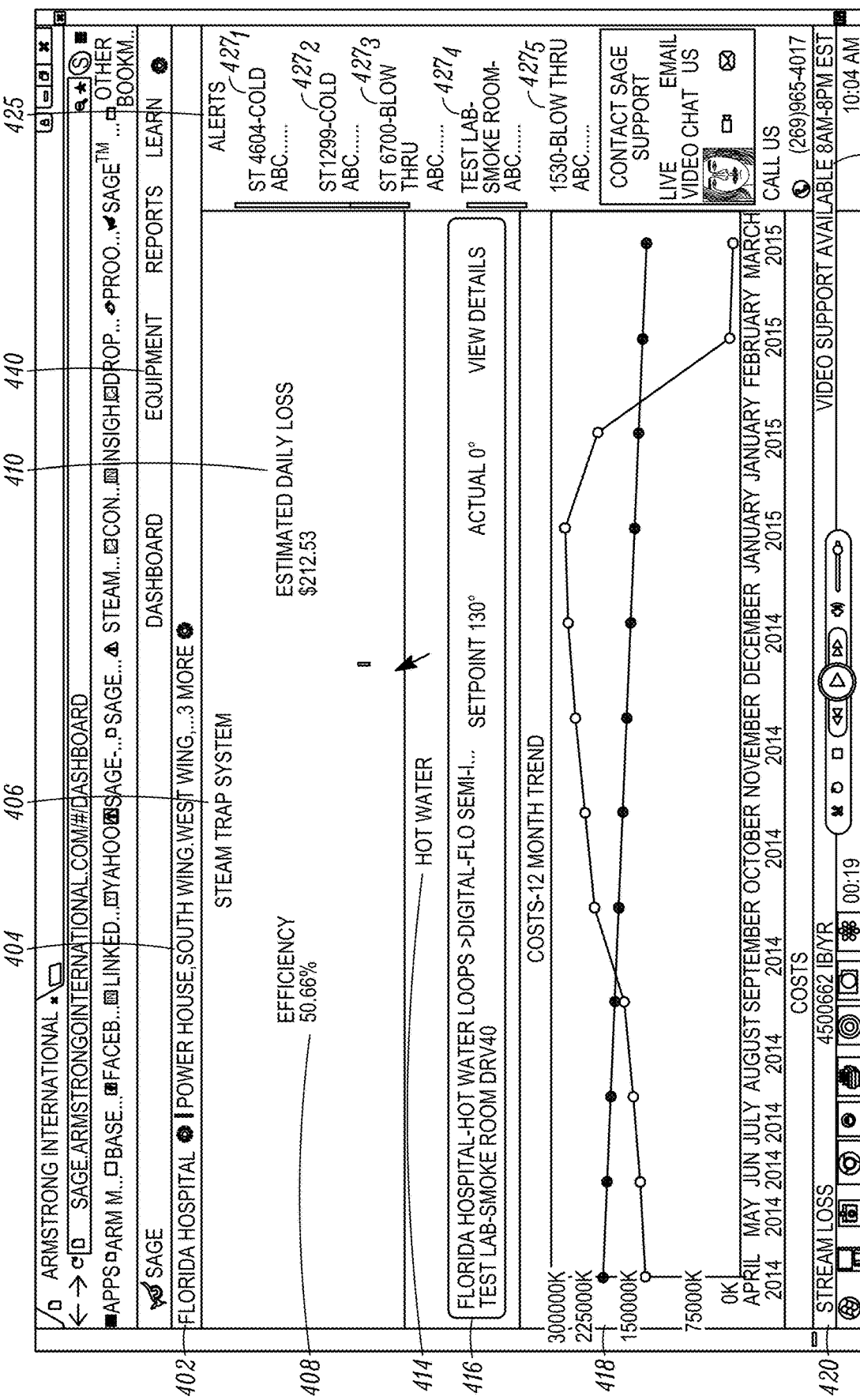
FIG. 4 is a view of a display as generated by the present system according to an embodiment.

FIG. 4 shows a dashboard 400 representing a specific enterprise and location. Dashboard 400 is a detailed view of the dashboard 200. The reference numbers in FIG. 4 are the same those in FIG. 2 but with the most significant digit changed from "2" to "4." The dashboard 400 shows a value of "Florida Hospital" in the location field 402. This value can be changed by selecting the field to open a drop down menu and then selecting a new location. Selecting a new location in field 402 will change the values in the group field 404 and system fields 406, 414. The calculated data in fields 408, 410, 418 and 420 are also changed. The dashboard 400 shows a value of "Power House, South Wing, West Wing . . . 3 more" in the group field 404. Thus, there are six selected groups in field 404 that are used to generate the displayed data. The user can select, using an I/O to the monitoring system (e.g., mobile device 120, computer 140 or the like), the field 404 to add or remove groups from the data being used for dashboard 400. At system field 406, the steam trap system for the selected groups is chosen. Each of the selected groups may have a plurality of devices that are used in the monitoring system 101. The central monitor 101 calculates the efficiency of the devices in the steam trap system and displays it in the field 408. Here, the efficiency is 50.66% and is shown with a color (yellow) indication. Here the efficiency shows that 50.66% of all steam traps (devices selected) are operating with acceptable levels. For example, if this number falls below 50%, the value in field 408 may be shown in another color, e.g., red. The monitoring system further calculates the daily loss based on the device in the steam trap system, here, $212.53. This value is displayed in field 410 in a color, e.g., green. This indicates that the daily loss is in an acceptable range. The cost trend field 418 shows a desired loss trend and the calculated, actual loss over the course of a year on a monthly basis for the devices selected.

The alerts field 425 shows the device fields $427_1$, $427_2$, $427_3$, $427_4$, and $427_5$. Each of the device fields show an identifier, an operating condition, a nest to which the device belongs, and a group to which the device belongs, as well as a status identifier. The status identifier is a color indicator, here in the shape of a bar to the left of the identifier. The identifier is blank for fields $427_1$, $427_2$, and $427_4$, which indicates that these devices are in a different unacceptable operating state. The identifier is colored, here, red, for fields $427_3$ and $427_5$ to indicate that these devices are not in an acceptable operating state. The devices shown in the alerts field 425 have an issue identified by the monitoring system as needing attention. Examples of unacceptable states include, but are not limited to, failure, lack of data, lack of current data, communication issues, operating outside acceptable thresholds, etc. The alerts field 425 can show alerts on a group basis, a nest basis, a location basis or an enterprise basis.

A user will login to the monitoring system, e.g., through the network 105, using a user device 140 (FIG. 1). The user device can be used to display the data in various forms, e.g., dashboards 200, 400 and display 300. Such dashboards/displays will provide the user device with real-time data regarding the operating condition of the enterprise, a location, a specific system or a specific device. The user can then schedule maintenance, make operating adjustments, or otherwise control the system or device. In an example, the user device receives instructions from the monitoring system to adjust a device or a system based on received or computed data. The user device can be a computer that can control settings or operational parameters of the devices and system. The user device can automatically change the settings or operational parameters of the devices and system.

FIG. 5 shows a mobile device 500 for use in the field to collect data relating to devices $501_1$ to $501_N$ with a display 502. Examples of mobile devices include an iPhone, iPod, Blackberry, Android, or other high tech phone or messaging device. Mobile device typically include circuitry to allow the device to enact numerous logic algorithms, a memory to store the algorithms and data, an input/output, and a display to communicate with the user, who may be holding the mobile device in his/her hand. A mobile device 500 can be used as the mobile device 120 described with reference to FIG. 1. A mobile device is useful with the present disclosure as a technician may carry the mobile device into a location whereat steam/hot water devices are installed to collect data from such devices. Moreover, with the mobile device 500 being a mobile communication device, the mobile device can access calculated data and status indicators from the monitoring system 101. Thus, the mobile device 500 can be a field tool that is within the installation location. In an example, the mobile device 500 is mobile phone that is owned by the enterprise or is a bring-your-own-device owned by a technician, who can access the data generated by the monitoring system 101. The mobile 500 may store instructions for running an application that interacts with the central monitor 101 and allows the user to enter data relating to a check of the devices in the field. The mobile device may require a user to log into the application, e.g., with a user name and password. Once logged into the application, a home screen is shown that lists the locations, groups or nests of devices to which the user is associated. This association can be stored in the mobile device 500 or stored in the monitoring system 101, which sends data over a network to the mobile device 500. The user can select a location, group or nest on the mobile device 500. In response this selection, the mobile device 500 displays the fields of FIG. 5.

A location field 505 indicates what location is chosen on the mobile device 500 and provides a means to select other locations. Moreover, the mobile device 500 logging into central monitor 101 or to a computer associated with a respective enterprise 110 can provide a group of devices associated with that enterprise or location. A search field 507 is provided to allow the user to enter a name of an enterprise, a location or a device to display a particular group of devices or a single device in the device field 501. The devices associated with the selected location are shown in fields 501.

At indicators 509, a status identifier is displayed for each of the devices 501. The indicators 509 are associated with respective devices 501. The indicators 509 provide a visual representation of the status of the device 501. If colors are used as the indicator of device status, then a first color indicator (e.g., red or orange) can indicate a lowest level, a second color indicator (e.g., yellow) can indicate an intermediate level, and a third color indicator (e.g., no color, white or green) can indicate the highest level of status. The lowest level of status indicates that this device 501 is operating below an acceptable level. The highest level of status indicates that the device 501 is operating at an acceptable level.

FIG. 6 shows a mobile device 500 with a condition selection operation. This operation can be launched by selection of any one of the devices 501, which then caused the mobile device 500 to shown the view of FIG. 6 for that selected device 501. Selection of a device can be performed by a first gesture on the device field 501. The condition field 601 is displayed along with a plurality of icons $603_1$-$603_N$. The icons 603 can be arranged in a grid pattern with the most used icons being within a finger reach with the user holding the mobile device in one hand. The icons $603_1$-$603_N$ are each associated with a status of the selected device 501. In the example, of the selected device being a steam trap the icons individually represent at least some of the following statuses of the device: OK (good); Blow Thru; Rapid Cycling; Plugged; Out of Service; Trap Abandoned; Not Tested; Not Found; Unknown; Flooded; Loss of Signal; Cold; Fault; Leaking; Alarm; Over Pressure; Cycle Count; Relief Alarm; Over Temperature; No Data Available; Status Alert; Device Not Configured, etc. The device 500 receives input from the user who contacts one of these icons (a square in the grid) and holds contact for a selection period, e.g., one second, 2 seconds, or more. The selected icon will be highlighted and the status will be stored in the mobile device 500 and then sent to the central monitor 101. The central monitor 101 will then update the database entry for that device and update any calculations involving that device. A cancel button 606 receives input into the mobile device 500 when the user desires to cancel this operation and return to the FIG. 5 state. A done button 607 receives input into the mobile device 500 when the user is done with this operation of updating the condition of a selected device and desires to return to the FIG. 5 state.

Changing the condition status of a device using the icons 603 will update the device status in the mobile device 500, which will report this change to the monitoring system 101. The calculations and data on the dashboard display 200, 300 or 400 may be automatically updated in real-time once the data is transmitted from the mobile device 500 to the monitoring system 101. The monitoring system 101, in an example, will not wait until days later to update its calculations and database.

FIG. 7 shows a mobile device 500 displaying device specific data in various fields. The mobile device 500 can move from the display 502 of FIG. 5 to display 702 of FIG. 7 by performing a second gesture on the display 502. The second gesture is different than the first gesture that moves the mobile display from display 502 to display 602. In an example, the first gesture is a short hold or tap on the device field 501. The second gesture is a long hold on the device field 501. The display 7020 shows data relating to the selected device and may include a device name field 706 that shows the name of the selected device. An image field 708 is provided to shown an image of the selected device. The image in the image field can be a stock photograph of a similar or same device, or be am image of the actual device. These images can be stored in the monitoring system 101. The image field includes buttons that allow the image to be updated using the camera in the mobile device or by selecting a previous image stored in the handheld. A status field 710 shows the current status of the device 501. If the user performs a gesture on the status field 710, then the mobile device 500 may change to the display 602 that allows the device status to be changed. A profile field 712 is on display 702 and can show an identifier, manufacturer information, data of service, or other data relating to the device. Cancel and done buttons 606 and 607 are in display 702, which will return the mobile device 500 to the display 502.

Figure 8:
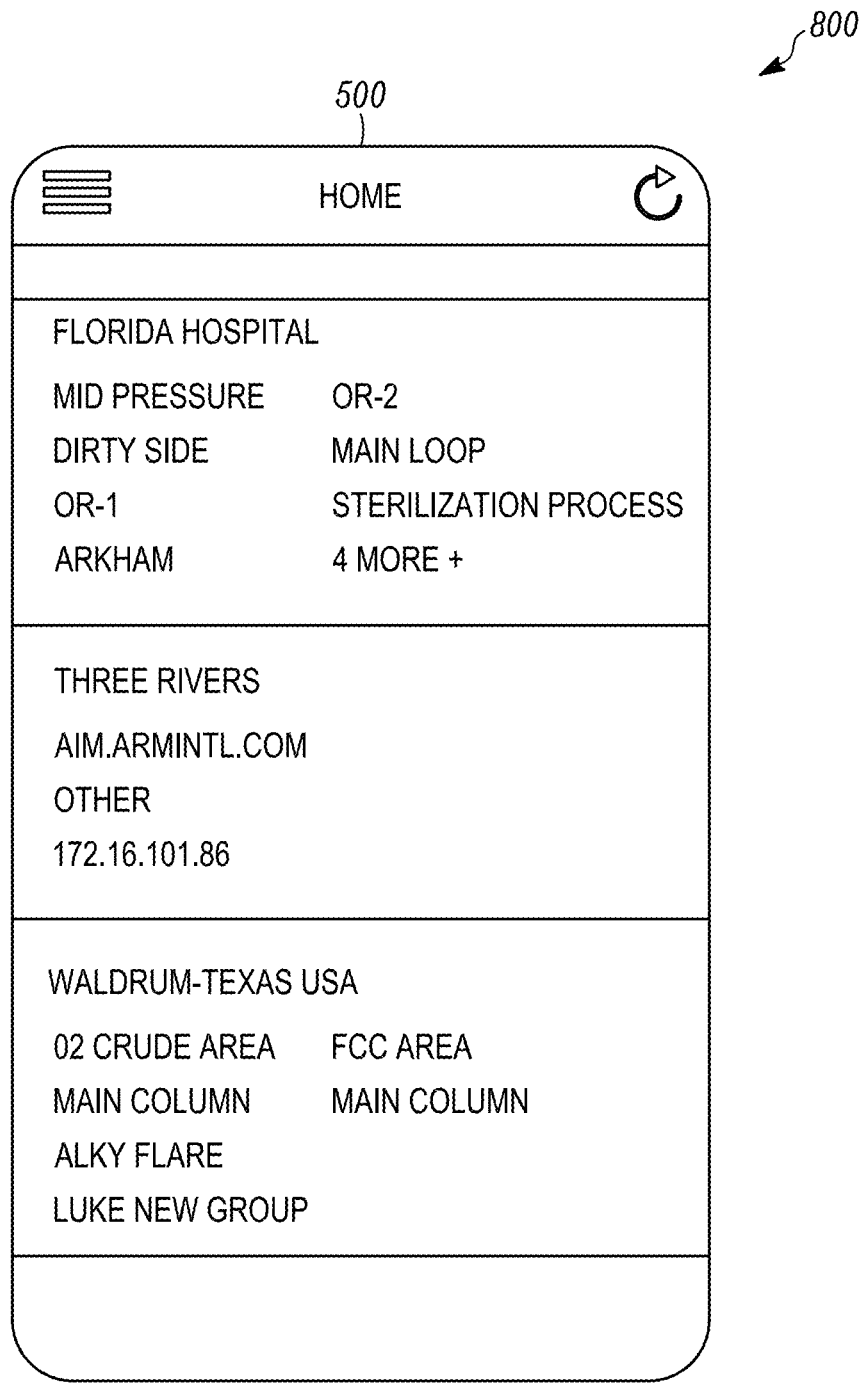
FIG. 8 is a view of a mobile device according to an embodiment.

FIG. 8 shows a view of an example home graphical user interface 800 on a display on a handheld, e.g., mobile device 500. The home GUI 800 includes the display of a plurality of selected enterprises, here three enterprises, Florida Hospital, AIM, Waldrum-Texas USA and locations of devices at these enterprises. The locations at this plurality of enterprises are listed below the enterprise names. In an example, if there is an underperforming device at any of these locations, an indicator can be placed at the enterprise graphical user interface. The indicator can display the good status or a warning status of a field device of the enterprise.

Figure 9:
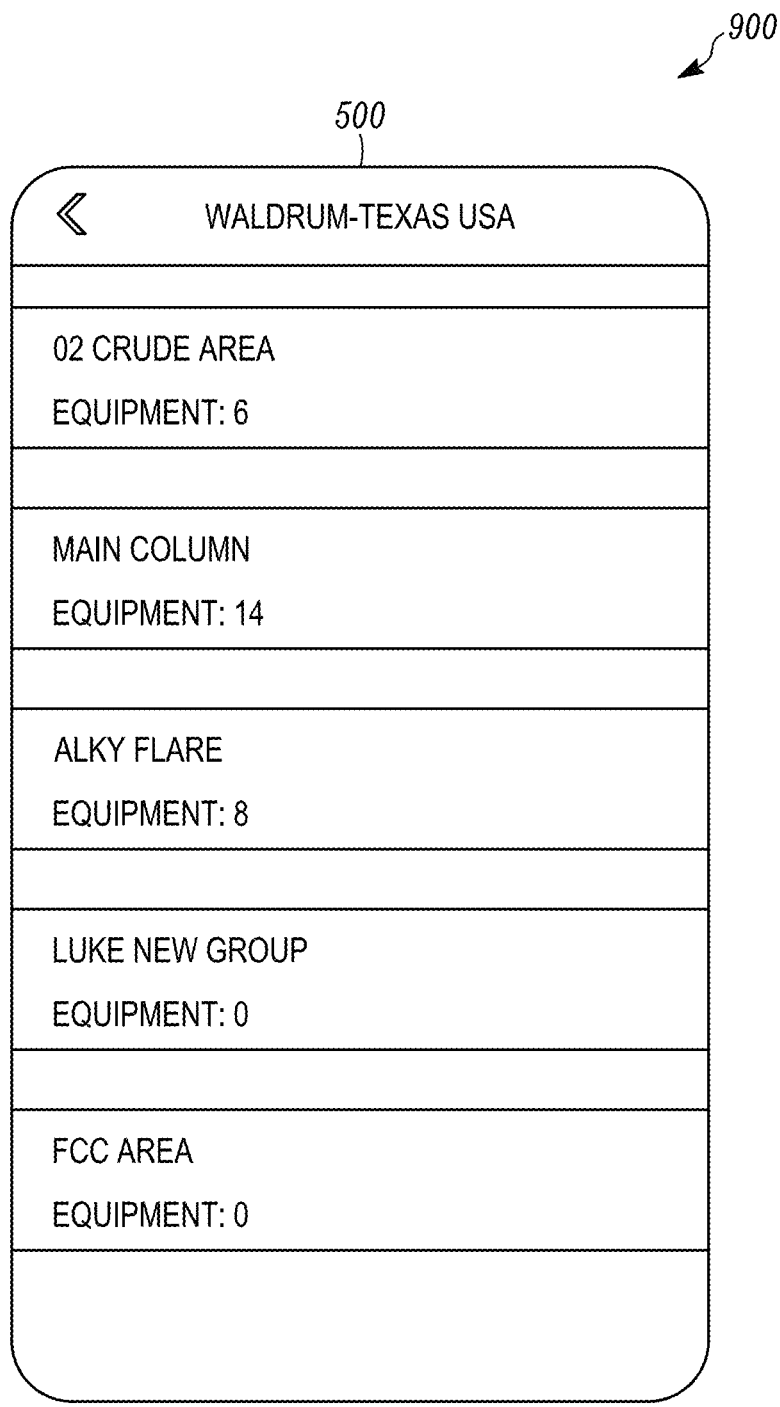
FIG. 9 is a view of a mobile device according to an embodiment.

FIG. 9 shows a view of an example location selected graphical user interface 900 on a screen display on mobile device 500. One of the enterprises of the location GUI 800 was selected and the graphical user interface 900 shows a plurality of field device groups at the selected location. The illustrated selected location is Waldrum-Texas USA, which is shown on the GUI 900 as a heading. The GUI 900 shows the name of the field device groups and the number of field devices in the group. If one of the field devices is in a warning or poor state, an indicator can be provided at the field device group field on GUI 900.

Figure 10:
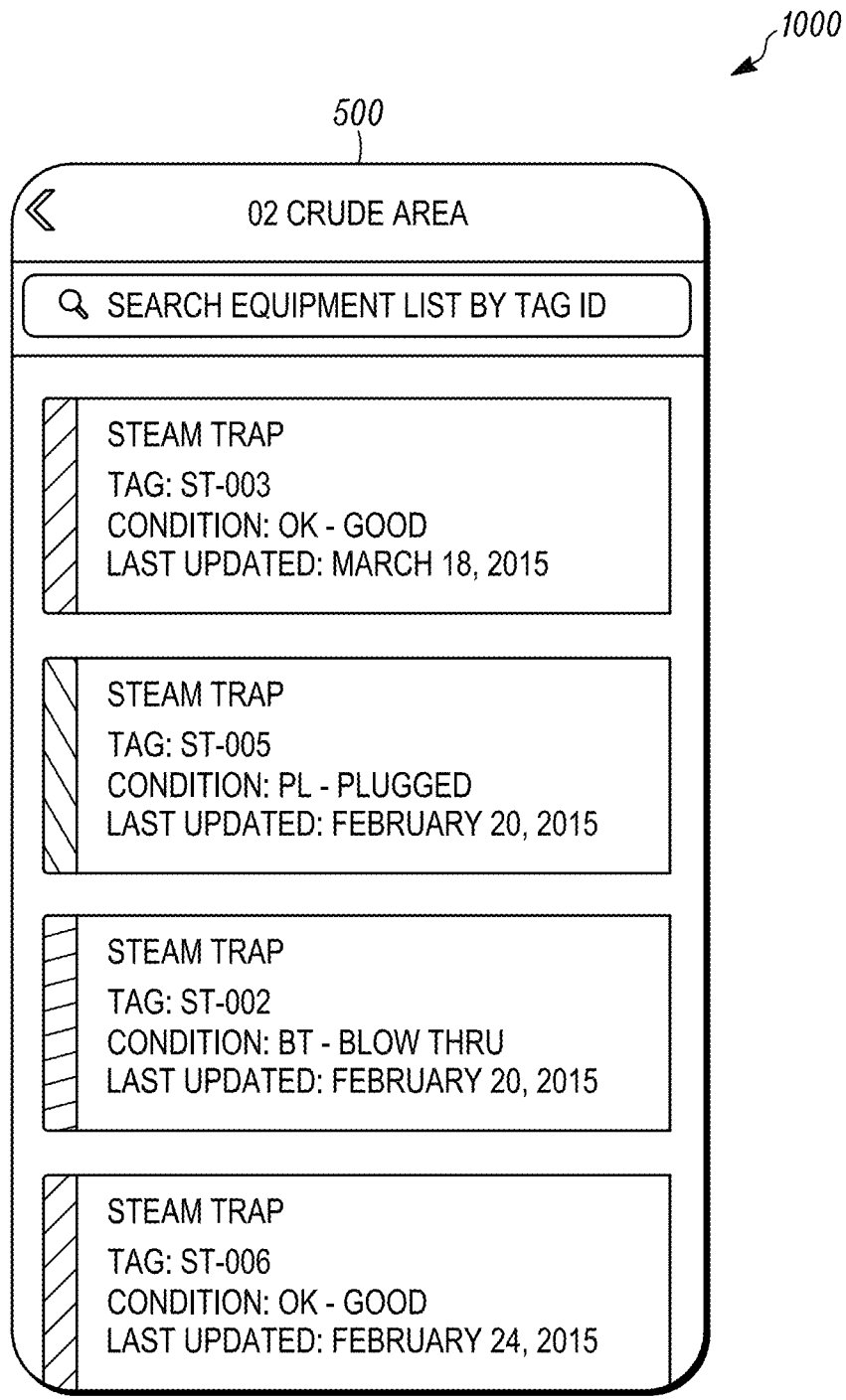
FIG. 10 is a view of a mobile device according to an embodiment.

FIG. 10 shows a view of an example device listing graphical user interface 1000 on a display screen of a mobile device 500. The GUI 1000 is a detailed version of the display 502 (FIG. 5), in an example. One of the groups of the location graphical user interface 900 is selected, here, 02 crude area is selected and is now shown in the heading of GUI 1000. GUI 1000 shows the names of the field devices in the selected group. Information specific to the field device can be shown adjacent the field device, e.g., it operational status can be shown. The operational status can include indicators as described herein. The operational status may also be spelled out, e.g., "OK," "OK—GOOD," "Good," "PL—Plugged," "BT—Blow Through" and the like. Other operational status may be used, e.g., using terms that are used in the hot water or steam technology that would be understood by a hot water or steam technician or engineer. The GUI 1000 shows the status of each field device using an indicator, here at the left of the field device. The indicator can be a colored area, e.g., a bar or rectangle. The indicators are cross hatched to indicate different status of the respective field device. Other indicators can be use, e.g., visual indicators.

Figure 11:
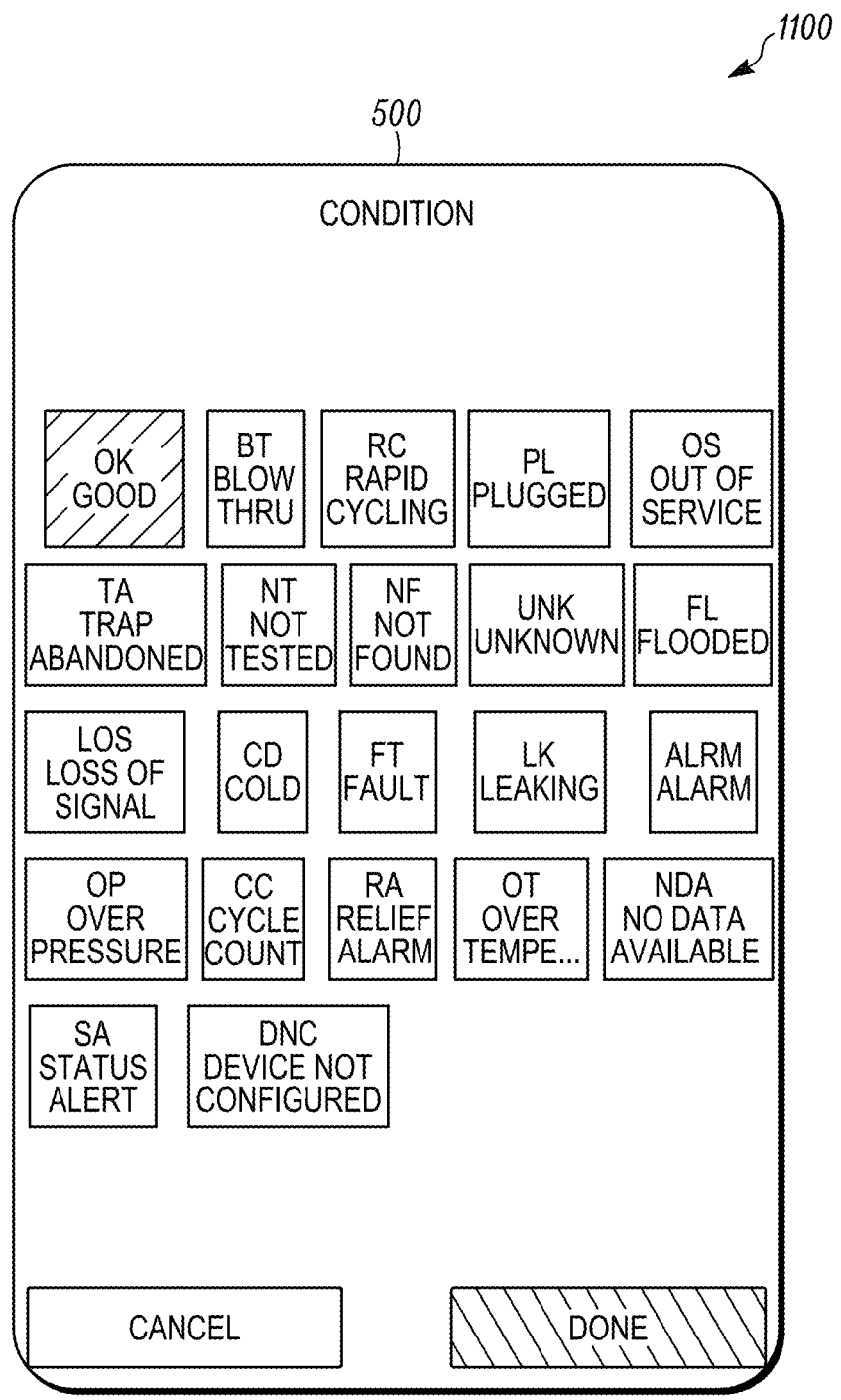
FIG. 11 is a view of a mobile device according to an embodiment.

FIG. 11 shows a view of an example filed device status update graphical user interface 1100 on a display of the mobile device 500. The GUI 1100 is a detailed version of the display 602 (FIG. 6). The GUI 1100 can list all of the possible statuses of the selected field device. The status of the field device is show as currently "OK—Good" using a graphical indicator, e.g., color, background color or the like. If the status is to be changed another status can be selected using the GUI 1100. For example, the user can tap or press the new status. The mobile device 500 will store the new status, which will be reported back to the central monitor. In an example, the GUI 1100 will not change until the current status is confirmed by selection or a new status is selected at the mobile device 500. The GUI 1100 includes a plurality of different statuses for a field device, here, shown as statuses for a steam trap. The plurality of different statutes is individually shown in squares that form an organized grid. The grid of status squares can be sized according to the number of different statuses for the field device. In the present example, all of the squares are the same size. The square "OK-good" is shown as selected, e.g., with an indicator. The indicator can be a color fill different than the other squares behind the alphanumeric.

Figure 12:
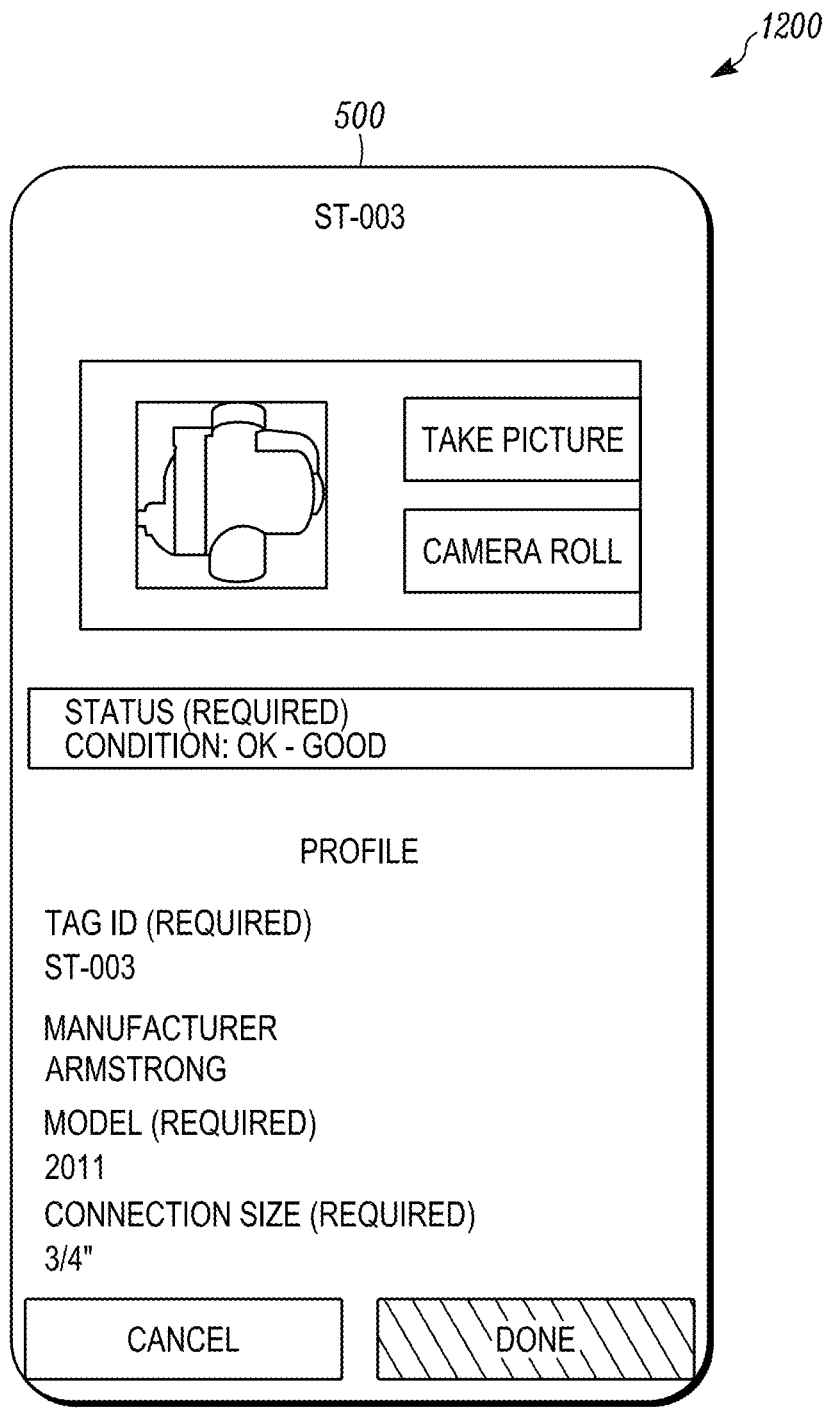
FIG. 12 is a view of a mobile device according to an embodiment.

FIG. 12 shows a view of an example detailed field device profile as a graphical user interface 1200 on mobile device 500. The GUI 1200 can be a detailed version of the display 702 (FIG. 7). The GUI 1200 shows an image of the field device, here shown as a steam trap. The name of the device is shown as a header. An image of the device is shown. The GUI provides selection buttons that allows another picture to be taken using the mobile device or a new picture to be selected from images already stored on the mobile device to be associated with this field device. Other profile information for this device can be shown on the GUI 1200. When review of the field device is complete, the done button can be selected on the GUI 1200. The data relating to this field device is stored in memory on the mobile device 500. If changes are made, then the mobile device 500 can upload the changed data to the control monitor after then done selection is made. The mobile device 500 may wait until it has a quality communication signal be attempting to push the changed data up to the control monitor.

While the above described examples of the graphical user interfaces describe a steam trap as the field device, other field devices can also be shown and their data forming part of the graphical user interface.

Figure 13:
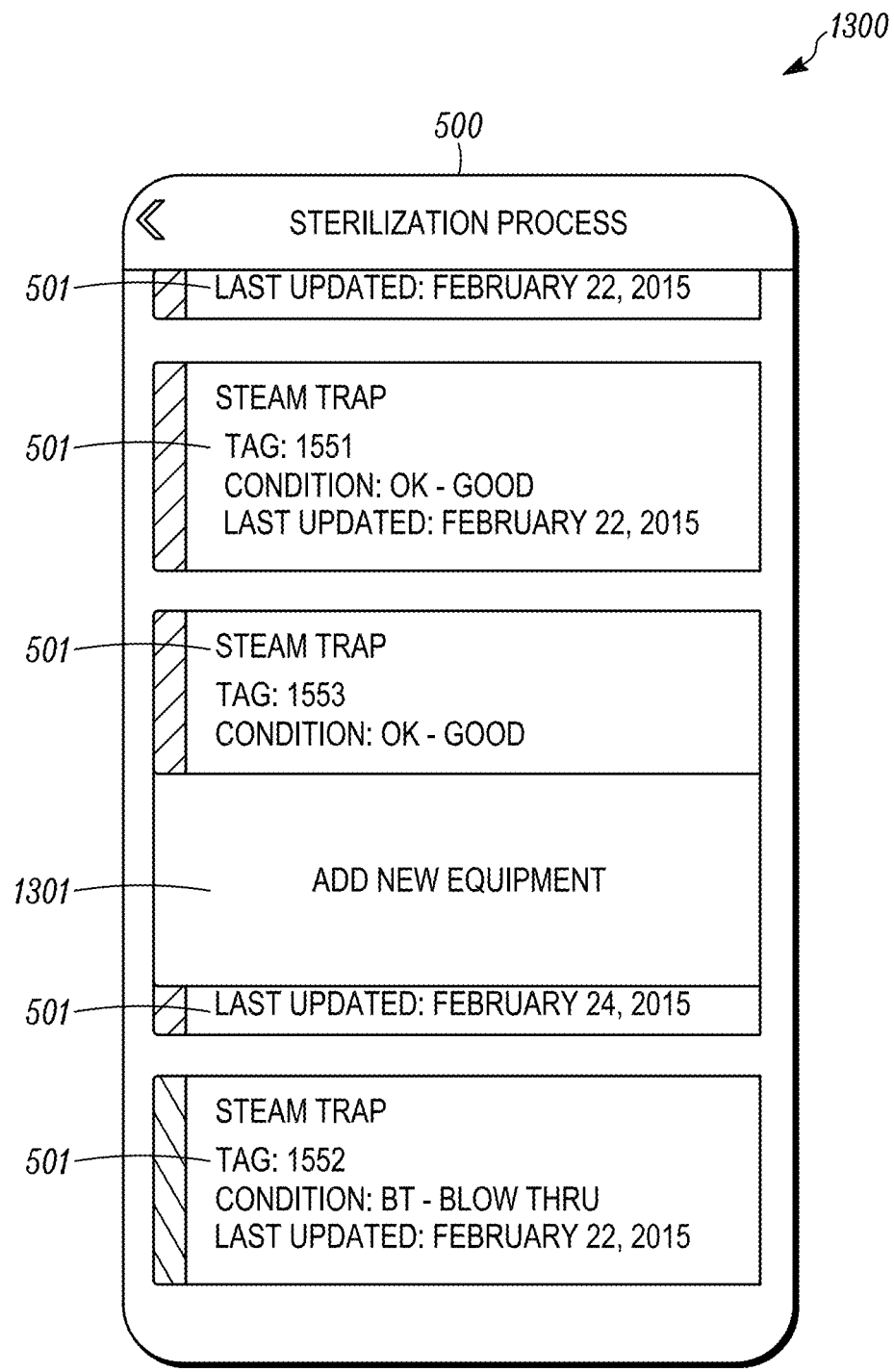
FIG. 13 is a view of a mobile device according to an embodiment.

FIG. 13 shows mobile device 500 with a GUI 1300 that lists the devices 501 associated with the selected location, here "Sterilization Process." It is desired to add another device to the listing of devices. The mobile device 500 senses a third gesture, which opens an "add new equipment" icon 1301 that is selectable by a user. The third gesture may be different than the first and second gestures. In an example, the third gesture is a pinch gesture with two fingers moving together and joining where the new equipment to be added to the list of equipment. In an example, the third gesture is a spread gesture with two fingers moving apart from where the new equipment is to be added. The selection of the icon 1301 allows the user to enter data, either typing on the mobile device or by selection from a list of possible devices. Such a list can be generated on the mobile device 500 from data stored at the central monitor 101 or with in the mobile device 500. The GUI 1300 shows the status of each field device using an indicator on the left of the field device GUI. The indicator is shown with cross hatching. The indicator can be different colors or other visual indicators.

Figure 14:
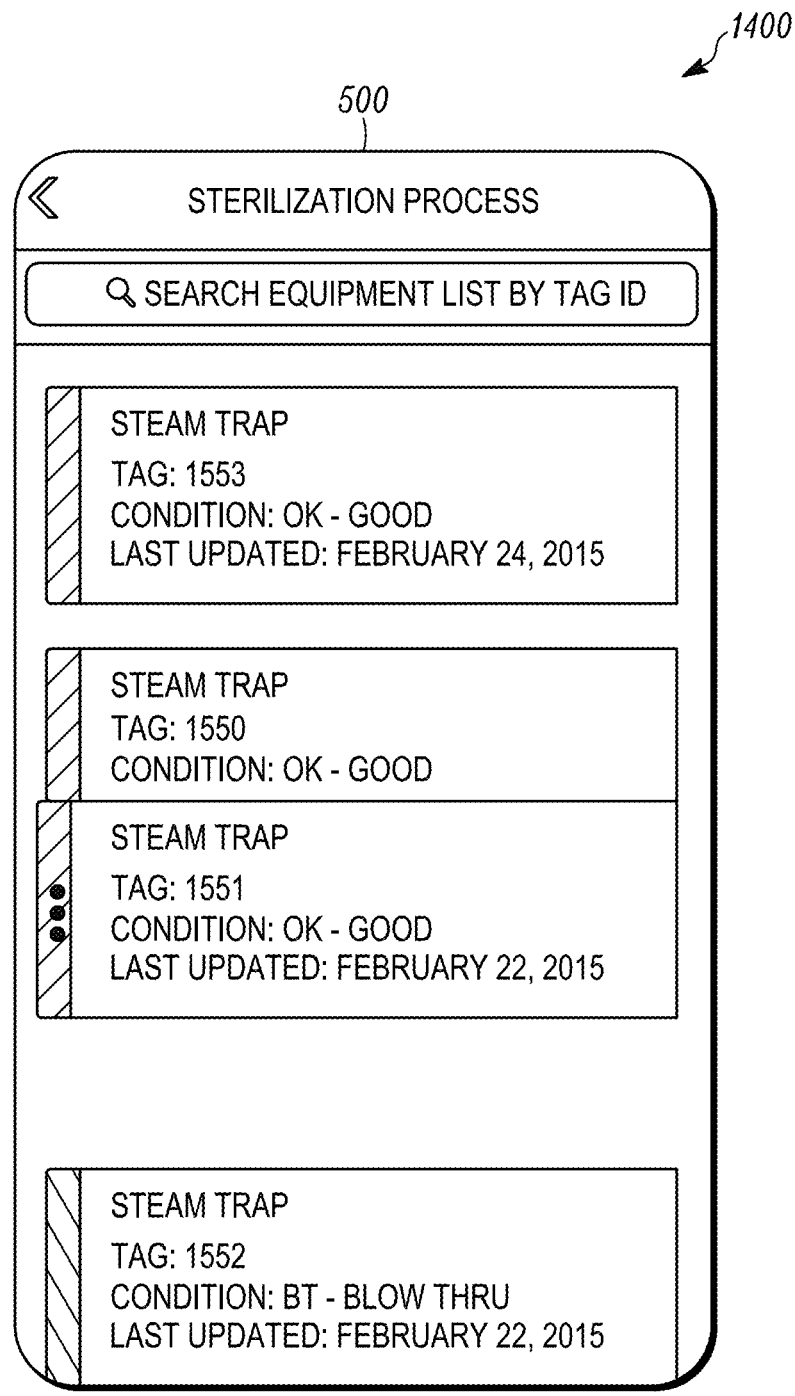
FIG. 14 is a view of a mobile device according to an embodiment.

FIG. 14 shows the mobile device 500 with a graphical user interface 1400 on the display of the mobile device. The GUI 1400 has a new steam trap (Tag 1551) being moved into the list of devices between the steam trap tag 1550 and the red indicated steam trap tag identification 1552.

Figure 15:
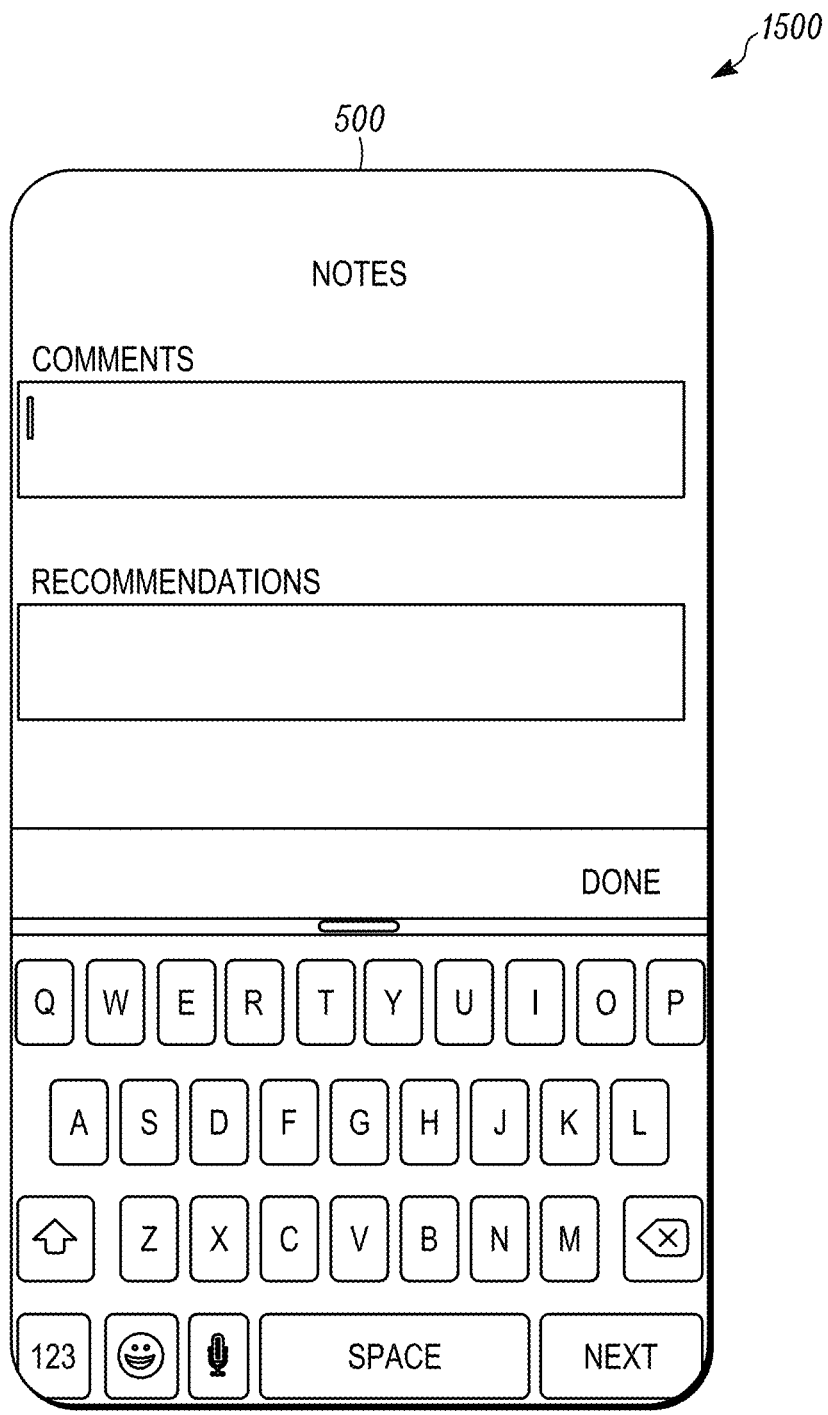
FIG. 15 is a view of a mobile device according to an embodiment.

FIG. 15 shows mobile device (e.g., a handheld) 500 with a display supporting a graphical user interface 1500 that allows entry of comments and recommendations relating to a selected field device 501 to be entered into GUI on the mobile device 500. The mobile device 500 to receive the comments relating to the field device 501 can be selected by a fourth gesture on a selected device as shown in the GUI. The fourth gesture is different than the first, second and third gestures. In an example, the fourth gesture is a linear swipe, e.g., a horizontal swipe. GUI 1500 then shows a virtual keyboard but if the mobile device is connected to another input device or physical keyboard, then the display 1500 need not show the virtual keyboard.

The mobile device 500 illustrations described above show some of the data available for a GUI on a mobile device display. Swiping on the GUI in the mobile device held up or down may scroll the display through the data available for current GUI.

The mobile device 500 identification may include integrated tester or be connected to other testers. The mobile device 500 may include a tester and a processor. In an example, the tester is a thermometer to test temperature at a device. In an example, the tester is a microphone to test sounds in a device. In an example, the tester can be a vibration detector for detecting the vibration of a steam trap (i.e., a device) when a valve thereof is closed. In an example, the handheld's processor may employ an algorithm to convert the detected vibration of the steam trap into a sealing performance deterioration value representing a deterioration level of the sealing performance of the valve of the steam trap under a reference steam pressure value using a working steam pressure value. Either the vibration data or the calculated deterioration value can be sent to the monitoring system 101.

Figure 16:
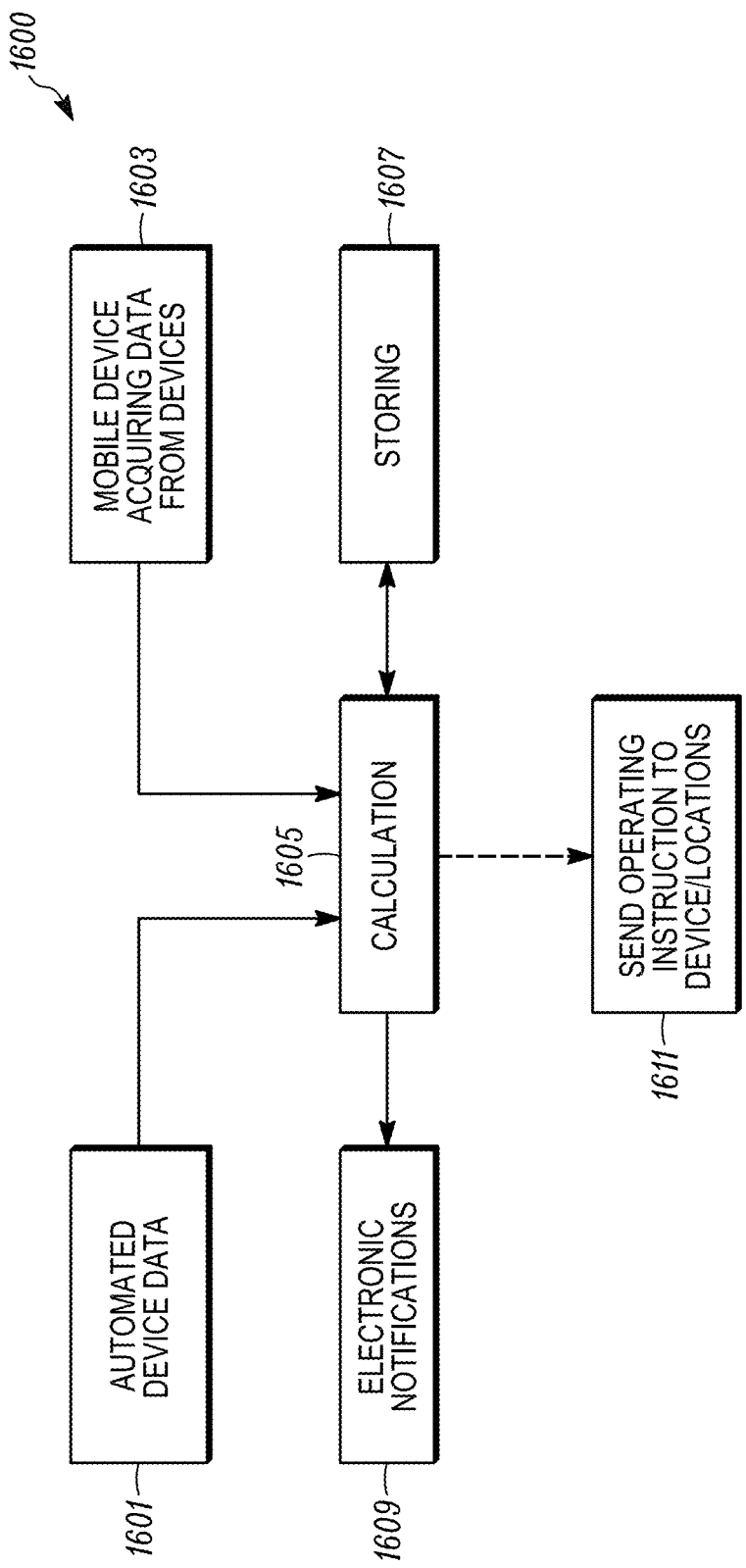
FIG. 16 is a flowchart depicting a method for monitoring and controlling devices used in a steam or hot water system.

FIG. 16 shows a method 1600 of operating the monitoring system. At 1601, device data is automatically sent from the mobile device to the calculation step 1605. Devices can have sensors and communication devices associated therewith to automatically report operating data of the device. At 1603, a mobile device is used to collect operating data from the devices. The mobile device may use gestures as described herein. At 1605, the calculation of derived data is performed. The calculation step may download data and rules to apply to the data from the storage. At 1607, the data, both raw and calculated, is stored in a memory. At 1609, electronic notifications relating to operation of devices, locations or enterprise are sent. Electronic notifications can include, but are not limited to, email, text messages, pager, audio messages. These electronic notifications can indicate that a device is operating in a good condition, an acceptable condition or a poor condition. At 1611, operating instructions to control individual devices can be sent to the devices or to the locations of the devices. The instructions can be automatically applied by the devices or may instruct maintenance personnel to change settings of the device. The operating instructions can be calculated by the central monitor 101 by applying rules to the data from the devices. These rules can be stored in the memory of monitoring system. The rules and data can be loaded into processors or logic circuits for execution. The result trigger the central monitor 101 to send a control instruction to a device, a location or to a person (e.g., via electronic notice). The result can also adjust the alert notices.

Figure 17:
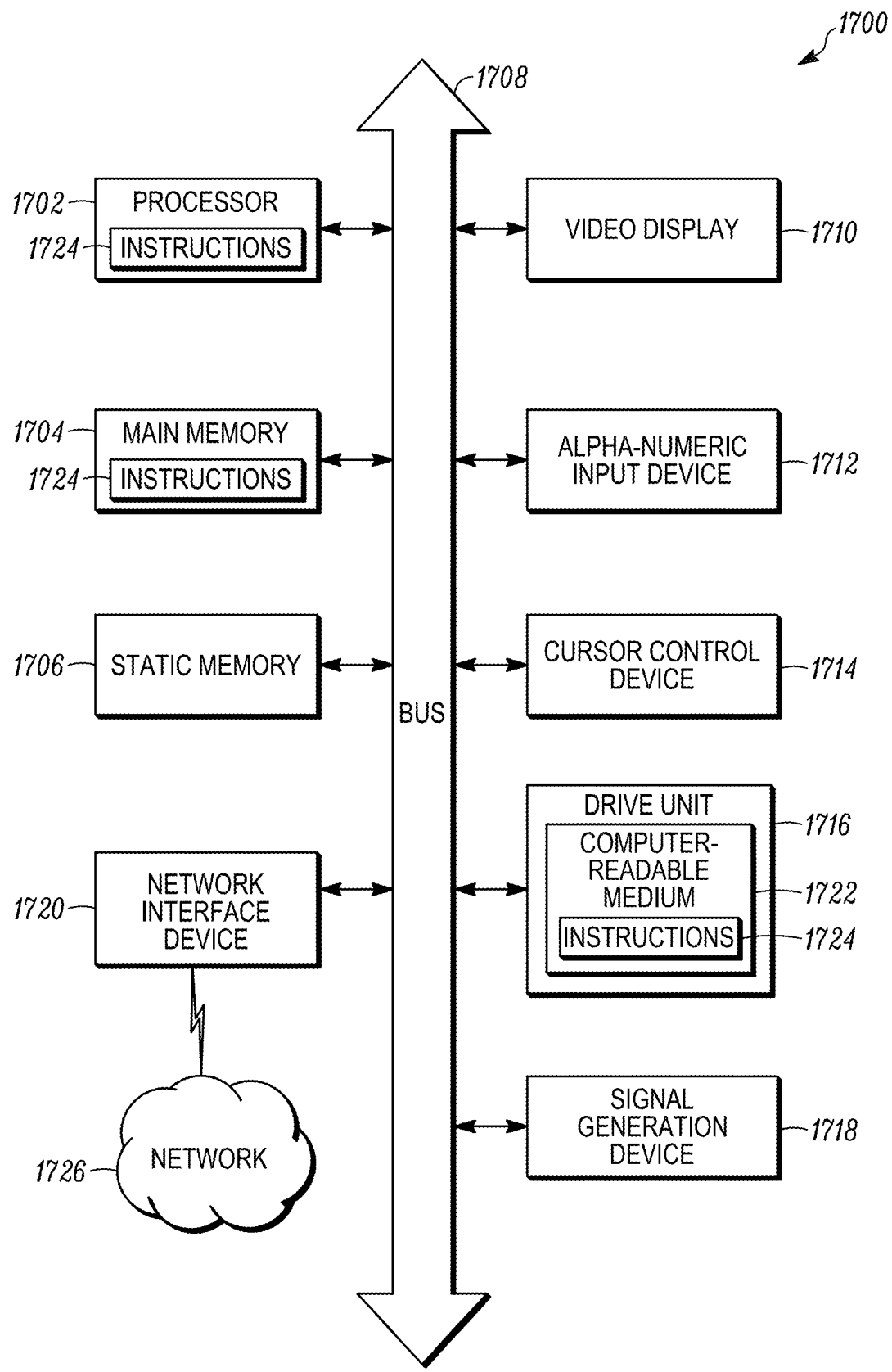
FIG. 17 is a block diagram of a dedicated machine in the example form of a computer system within which a set of instructions for causing the machine to perform any one or more of the methodologies discussed herein may be executed or stored.

FIG. 17 shows a block diagram of a machine in the example form of a computer system 1700 within which a set of instructions may be executed causing the machine to perform any one or more of the methods, processes, operations, or methodologies discussed herein. It will be understood that the devices, modules and other systems described herein may include a computer system within which a set of instructions may be executed causing the machine to perform any one or more of the methods, processes, operations, or methodologies discussed herein. The central monitor 101 and any of its modules, the network, the enterprise 110, the location 112 and the mobile device 103, for example, may include the functionality of the one or more computer systems 1700.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU) a graphics processing unit (GPU) or both), a main memory 1704 and a static memory 1706, which communicate with each other via a bus 1708. The computer system 1700 further includes a video display unit 1710 (e.g., a liquid crystal display (LCD) or a cathode ray tube (CRT)). The computer system 1700 also includes an alphanumeric input device 1712 (e.g., a keyboard), a cursor control device 1714 (e.g., a mouse), a drive unit 1716, a signal generation device 1718 (e.g., a speaker) and a network interface device 1720.

The drive unit 1716 includes a computer-readable medium 1722 on which is stored one or more sets of instructions (e.g., software 1724) embodying any one or more of the methodologies or functions described herein. The software 1724 may also reside, completely or at least partially, within the main memory 1704 and/or within the processor 1702 during execution thereof by the computer system 1700, the main memory 1704 and the processor 1702 also constituting computer-readable media.

The software 1724 may further be transmitted or received over a network 1726 via the network interface device 1720.

While the computer-readable medium 1722 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media. In some embodiments, the computer-readable medium is a non-transitory computer-readable medium. In other examples, a computer-readable medium is any medium that satisfies statutory requirements and stores instructions for use by a machine.

Figure 18:
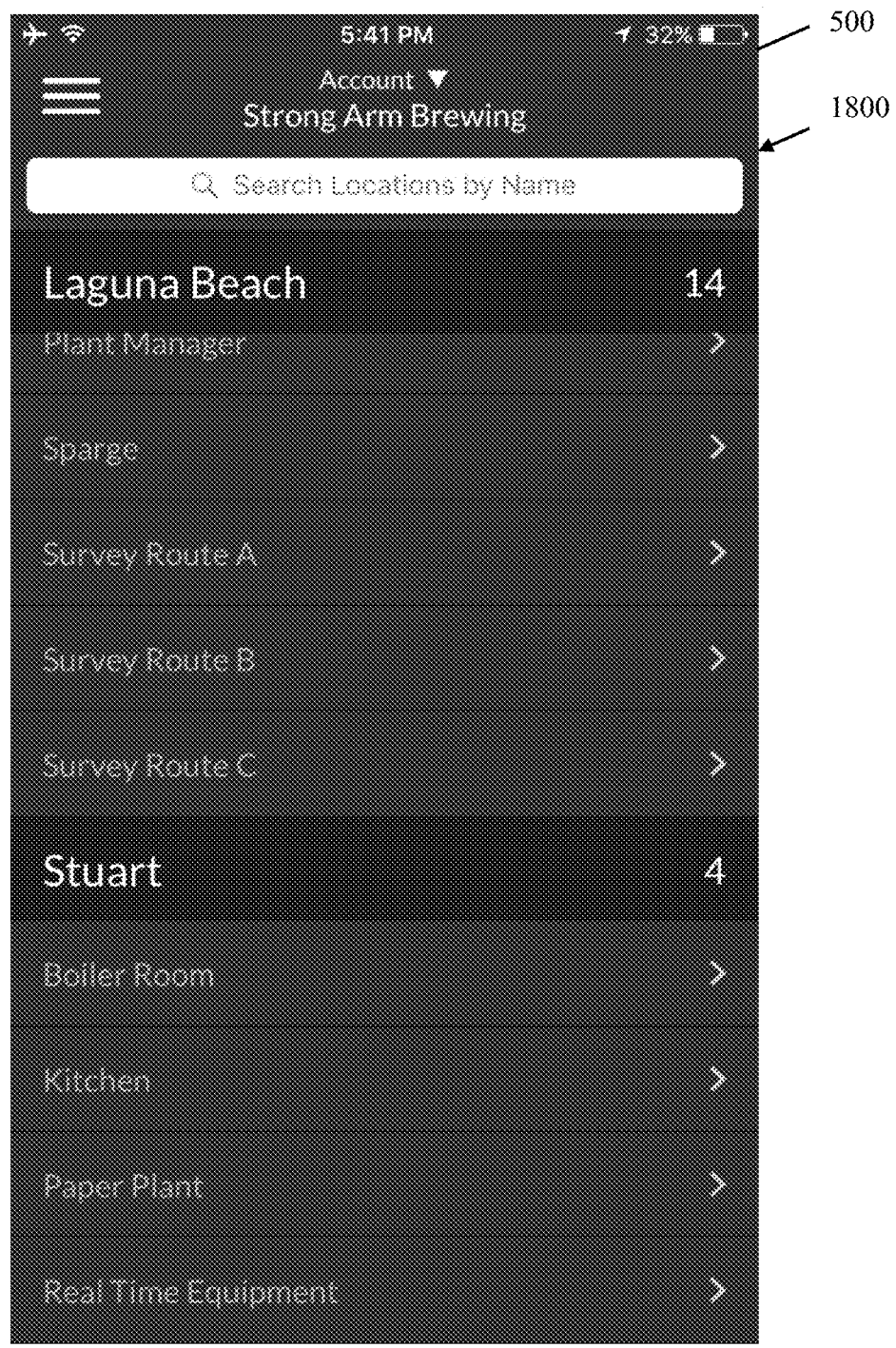
FIG. 18 is a view of a mobile device according to an embodiment.

FIG. 18 shows a graphical user interface 1800 on a mobile device 500. The graphical user interface 1800 shows a location selection for a selected enterprise, which is shown and selectable at the heading. The graphical user interface 1800 shows a first enterprise, here, Strong Arm Brewing. Other enterprises may be selectable on the mobile device 500. The enterprises associated for the device 500 are stored in the memory of the device. The field devices for each enterprise are also stored in the mobile device as well as organizing the field devices into locations and groups. Only the locations, the groups and field devices for a selected enterprise are shown on the GUI 1800 at one time. The locations of field devices for the first enterprise are listed in the GUI 1800. These illustrated locations are Laguna Beach and Stewart. The number of field devices in each location groups is displayed by the GUI 1800. Here the numbers of field devices are 14 and 4, respectively. The groups of the field devices are listed under each location. If the number of groups exceeds the space in the GUI 1800 under the location header, then a scrolled list is generated, which is scrollable via interaction with the GUI 1800. If the location or the group is selected on the GUI, e.g., by a touch or a side to side gesture, then the GUI 1800 will show the list of field devices for a location or a list of field devices for a group.

Figure 19:
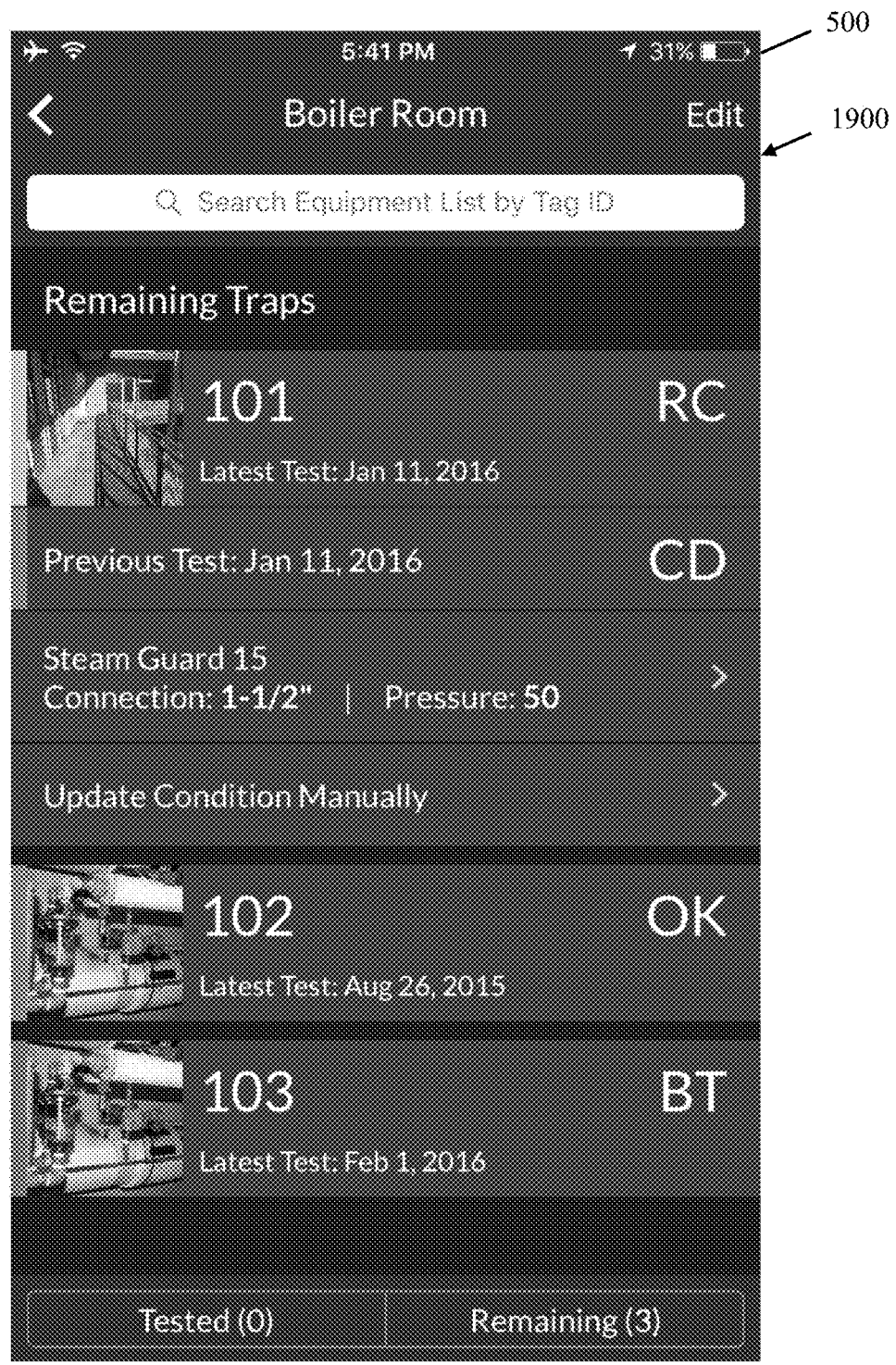
FIG. 19 is a view of a mobile device according to an embodiment.

FIG. 19 shows a graphical user interface 1900 on a mobile device 500. The graphical user interface 1900 shows a listing of field devices associated with the boiler room of the Stewart location listed in GUI 1800. GUI 1900 shows three field devices, with ID numbers 101, 102 and 103. Each of the field devices are steam traps. The GUI 1900 shows an image of the physical placement of the field device to assist in the location of the field device along with an indicator of the current status of the field device. The indicator is a colored bar alongside the field device information in the GUI 1900. Other indicators can also be used. The code for the current status of a field device is also shown. When a field device is selected, here, the first field device with ID number 101, then the GUI 1900 shows additional detail for the selected field device. The additional field device information can be the previous device test information along with an indicator for the status of the selected field device at the time of the prior test (or inspection). The latest test information for each of the field devices can be shown by the GUI 1900.

The GUI 1900 can also show the number of devices in the group, the number of devices tested, here shown as zero, and the number of devices to be tested, here shown as three as none of the field devices have been tested.

Figure 20:
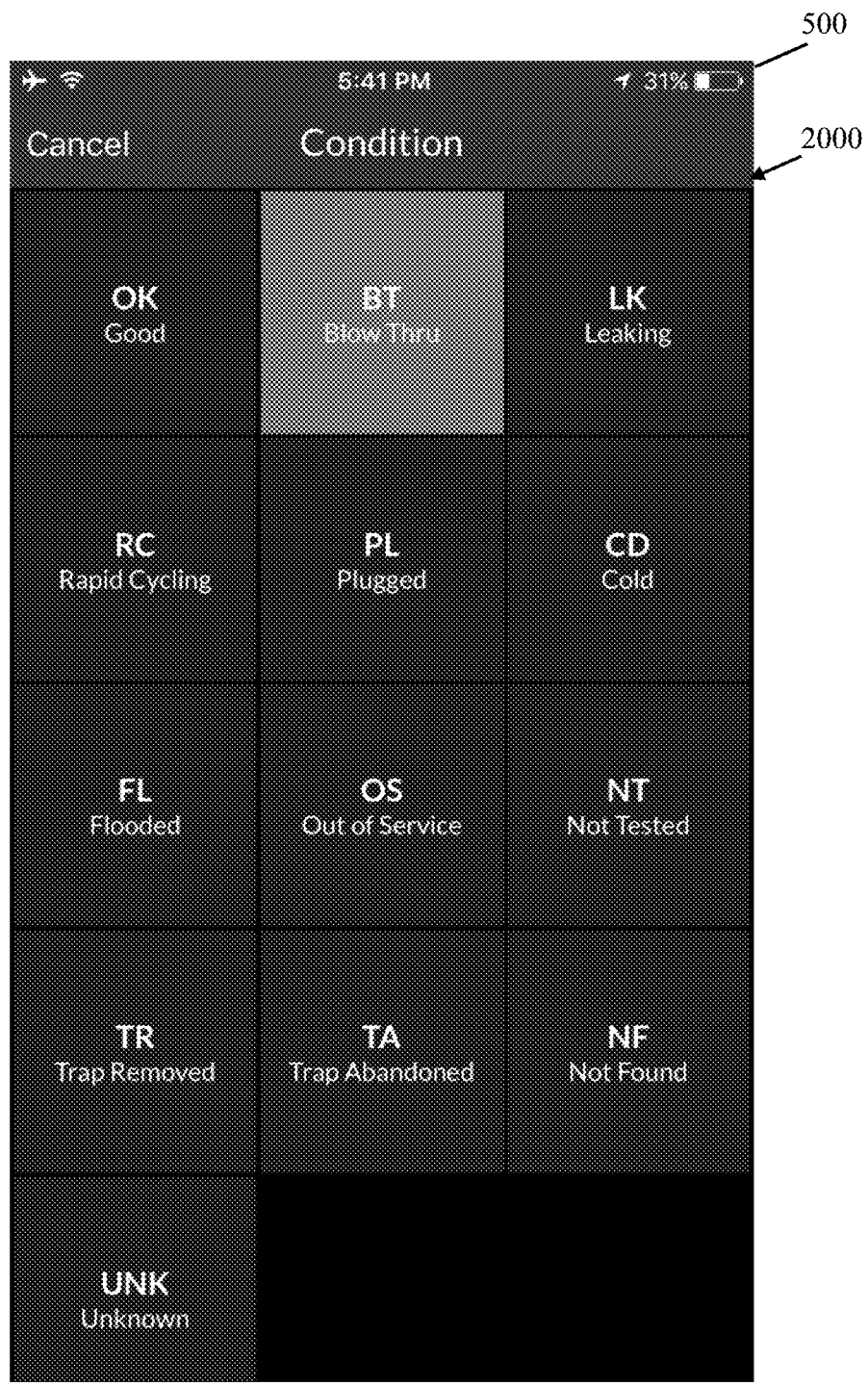
FIG. 20 is a view of a mobile device according to an embodiment.

The GUI 1900 allows a user to gesture to select to update a field device manually. The use may tap or swipe on the GUI 1900 at the location labeled "Update Condition Manually." When activated the GUI on the device can move to GUI 2000 (FIG. 20).

The GUI 2000 shows a grid of possible conditions for the field device selected, here shown as field device 101 (GUI 1900, FIG. 19). The possible conditions grid can include a plurality of rectangles arranged in a plurality of columns (here shown as four) and a plurality of rows (here shown as five). Each rectangle graphical element is represents one status that can be stored in the mobile device for the selected field device. When the graphical element for the status of the selected field device is activated, then the GUI on the device can move back to GUI 1900. The rectangles for the status of the field device can be sized to efficiently fit on a single display of the mobile device 500.

Figure 21:
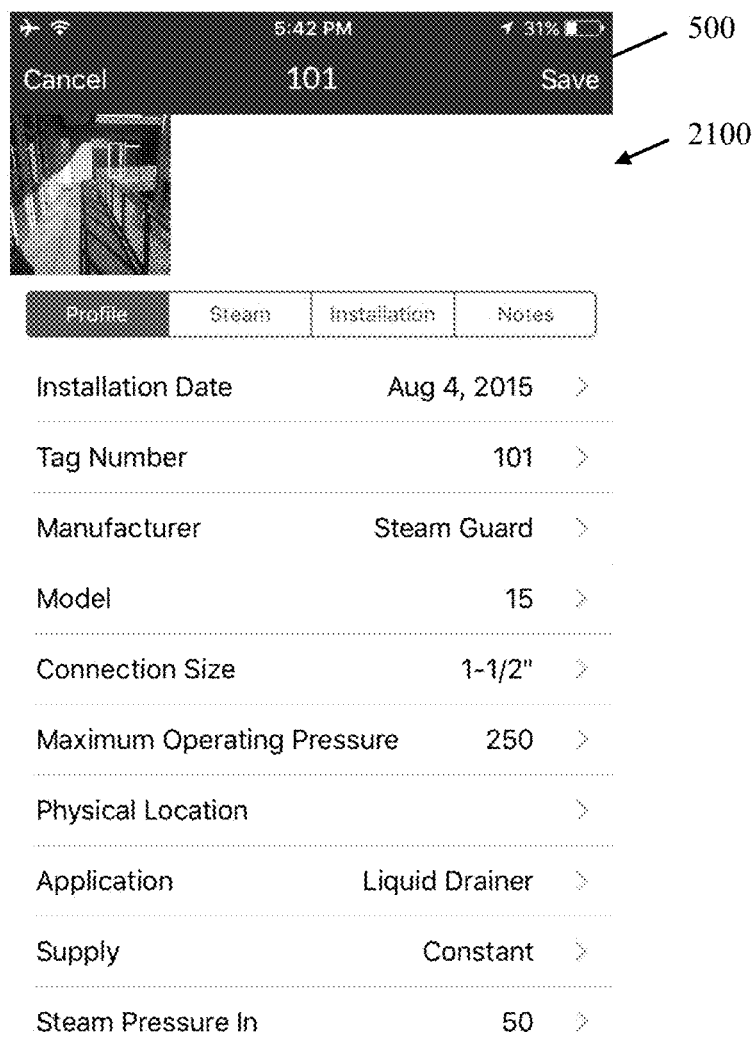
FIG. 21 is a view of a mobile device according to an embodiment.

FIG. 21 shows a mobile device 500 with a graphical user interface 2100, which shows the profile details of a selected field device. In an example, a user may gesture on the filed device area in GUI 1900, e.g., tap or swipe. The mobile device 500 will then produce the profile history for the selected field device. The profile history data can be stored in the mobile device when the mobile device has a quality communication connection prior to entering the environment of the field device. The profile history data may include the installation date, the tag ID, the manufacturer name, the model number, the connection size, the maximum operating pressure, the physical location, the application information, the supply information, the steam pressure in, and the like. Other types of field devices will have different profile information that is pertinent to that field device. All of this data can be downloaded to the mobile device before the mobile device enters the environment of the field device.

The present disclosure works with steam/hot water systems that contain devices to control, condition, manage, and monitor the steam or hot water. Such devices can be steam traps, e.g., those described in U.S. Patent Publication No. 2011/0316707, which is hereby incorporated by reference. Other examples of such devices include, but are not limited to, steam tracing devices, condensate controllers, pressure-reducing valves, temperature regulators, condensate coolers, drain separators, water temperature controls, water heaters, boilers, digitally controlled valves, digitally controlled mixers, and the like. Devices as part of the hot water system or a steam system can be elements that control or affect the operation in some manner. Some devices may include mechanical components. Some devices may be purely mechanical in nature. Some devices may include electrical components. The present system can monitor these devices and store the results in a memory, e.g., database 131. The data can be collected using a mobile device or be automatically reported from the devices if connected to a network. Some devices may have a memory that stored operational parameters and this data must be downloaded, e.g., over the network 105, to the monitoring system 101. The present system can further process this data to indicate performance of a system at an enterprise, location, group, nest or device level.

The present disclosure uses the terms groups and nests to describe selections of a plurality of field devices. The groups and nests are ways of assembling field devices together in a manner that is helpful to a user, a technician an engineer, or anyone who works with the field devices in a hot water system or a steam system. A group is a logical collection of field devices, e.g., within a location. A nest is a logical collection of field devices, which may be limited to a single location or may cross locations but have some logical connection. Groups and nests can be used in place of locations to calculate data or populate lists on the mobile device or monitoring system.

A gesture as used herein is a movement adjacent to a mobile device or other mobile device, e.g., a display, which can be sensed by circuitry in therein. Gestures can include a single touch gesture or a multi-touch gesture using one or two fingers to trace out a particular trajectory or pattern on or near a display or sensors. The sensors can be capacitive, resistive or optical. The gestures are sensed and used as input by the mobile device or other device.

The presently described methods and systems can be used with hot water systems to monitor the system and provide real-time status updates. In an example, the real-time updates can be sent from the central monitor 101 over the network to handhelds 120, in the form of electronic messages, e.g., email, SMS messages, MMS messages or digital audio messages. The alerts can also be sent from the central monitor 101 to an application running on a remote electronic device, e.g. the mobile device 120. The central monitor 101 can be in electronic communication with BRAIN branded products from Armstrong International of Three Rivers, Mich., USA, including water temperature controls, water mixers, recirculation systems, etc.

The presently described methods and systems can be used to calculate safety ratings and provide safety updates on a device, a grouping, a location or an enterprise level. The central monitor 101 can employ algorithms that use the data from the devices to calculate a safety rating and provide the safety rating to system personnel. The algorithms, when loaded, create a dedicated machine that only performs the instructions loaded into the central monitor.

The presently described methods and systems can provide real-time updates to the status of steam systems and hot water systems. This is particularly true for systems that have automated data reporting from any device in the system. Such automated reporting allows the data to update minute by minute so a real-time view of the system is available. In system's that lack all devices reporting in real-time, then the calculations are made by the central monitor 101 using recent data stored therein. Updates to the calculated results can be made as soon as new data is available, e.g., from a technician entering data in the field. The new data can be from a mobile device being used by the technician. The real-time updates can be in the form of alerts that can be electronically transmitted and displayed using indictors of status. The real time alerts may depend on the ability of the mobile devices to timely push the updated information regarding inspected or tested field devices. The mobile device can be set to automatically send updated information to the central monitor as soon as it has a connection.

The central monitor 101 can provide daily, monthly and yearly losses on many different bases. For example, the monitoring system can report the monetary value lost, the emissions created, the water loss, the pounds of steam lost, etc.

The central monitor 101 can determine condition of devices at various levels, e.g., a group, a nest, a location and an enterprise. Using all of the devices a level, an accurate, real-time calculation of the performance of that level is determined. The present system may further allow the prediction operation based on a change a device in the level. This may show improvement of performance by replacing or servicing a specific device. When a field device is repaired or replaced, the central monitor 101 can update the performance data.

The central monitor 101, which can collect data on a large scale across multiple enterprises, allows the prediction of end of life of devices and can improve a service schedule using the knowledge derived from all the data relating to a specific type of device. For example, a particular device can be classified as a device that requires more frequent maintenance than initially scheduled.

The central monitor 101 can issue control signals over the network to individual devices that are part of a monitored system. The control signals can control the output from a mixing valve or control temperature of water input into the hot water systems. The control signals are generated using the data in the monitoring systems and applying algorithms thereto. In an example, the central monitor 101 can sent a temperature set point to a mixing device in the hot water system.

In operation, monitoring field devices, e.g., steam traps, other steam processing devices, or hot water devices, may include surveying the environment, e.g., a building to locate all existing field devices. The survey may be entered at the central monitor. In an example, the mobile device may be used to inspect the environment and enter the field devices using the graphical user interface of the mobile device. The mobile device may identify the field devices using an enterprise, a physical location, the type of installation, the type of use, the type of field device or any other data. The mobile device may also take a picture of the field device. This data can be pushed to the central monitor when the mobile device is at a location where there is a communication link to the central monitor, e.g., a wireless connection or a wired connection. The central monitor can number and organize all of the existing field devices. The central monitor can create and store a master field device location table showing the location of all the field devices.

The central monitor can use its algorithms to decide which field devices to monitor. These field devices can be assigned to a mobile device. The data relating to the assigned field devices is downloaded to the mobile device before the mobile device enters the environment, which may limit communication from the mobile device. The mobile device will have a graphical user interface that will provide the inspection route or data relating to the field devices to be inspected.

The central monitor can also assign field devices to mobile devices when a field device is in need of corrective action, e.g., when the field device is not operating as desired. Such filed traps may be indicated using indicators on the graphical user interface to indicate that a field device is operating sub-optimally.

The present disclosure refers to mobile device, which may be handhelds. It will be understood that mobile device can also include mobile devices that are portable by a single person and used in a mobile manner. Such mobile devices include tablets, phablets, small computers (e.g., netbooks and laptops), testers with processors adapted to hot water or steam applications, and the like.

When a new mobile device is used to inspect field devices that the mobile device has not before inspected the field device, all of the data for the field device or group of field devices can be downloaded to the mobile device. In an example, the control monitor can download the data regarding all of the field devices the night before the inspection or when the inspection of these field devices are assigned to the mobile device.

In an example, a mobile device is associated with a specific technician. The mobile device may be that technician's mobile smartphone. When inspections or tests are assigned to a technician, the corresponding stored data regarding the field devices covered by the inspections or tests is downloaded from the central monitor to the technician's mobile device.

In an example, a mobile device is assigned to a location or a group of field devices. The mobile device can stay on site at the location or near the group of devices. When a technician is assigned to check the field devices at the location or the group, the technician retrieves the mobile device, logs into the application running the instructions to carry out the methods described herein and then receives the GUI to find the field devices and enter the testing data.

The system and methods, in various embodiments, described herein can also address the technical problem of communications in industrial and commercial environments. Hot water and steam systems use significant amounts of metal in their infrastructures or are placed in environments that do not yield quality wireless communication or any wireless communication at all. In some environments, the piping can act as a Faraday cage and block or interrupt the propagation of electrical signals. In some environments, the operation of some industrial processing equipment may also produce stray signal that interfere with wireless signals. The present inventors recognized the need to improve the communication to and from field devices and mobile devices that are used in the field. The traditional method of taking a clipboard with paper worksheets is inefficient. The control monitor as described herein can store large amounts of data regarding field devices. Data that is pertinent to a specific mobile device, e.g., a handheld, can be downloaded to the appropriate mobile device before it enters a communication hostile environment. In an example, the control monitor downloads the data for field devices the day before those field devices are to be serviced or checked. In an example, the mobile device runs software that communicates with the control monitor. The data can be encrypted for security. When the mobile device is being used and has a poor wireless connection, it can store the updated data. When the mobile device has a quality connection, e.g., a strong WiFi signal or a strong cellular signal (short range communication channels, e.g., Bluetooth), the application running on the mobile device can push the changes to the control monitor. As a result, field devices can be checked with accurate data about the devices and changes to the data are communicated back to the control monitor when the mobile device has reliable communication.

Problems with communications within environments using steam or hot water systems was described in U.S. patent application Ser. No. 12/824,326, filed 28 Jun. 2010, titled "Remote Monitoring System for Multiple Steam Traps," which is hereby incorporated by reference. This patent application described a system for remotely monitoring multiple steam traps includes a plurality of steam traps, each including a monitor comprising one or more sensors for sensing selected operating conditions of the steam trap, and a programmable controller operatively connected to receive the outputs of each of the sensors, convert the sensor outputs into one or more data signals corresponding to the sensed conditions, and transmit the data signals, directly or indirectly, to a central computer. The central computer includes a receiver and logic for evaluating the data received from the monitors to thereby monitor the condition of the steam traps. At least some of the steam trap monitors also include a local receiver adapted to receive data signals transmitted from other steam trap monitors and re-transmit the received data so that remote monitors otherwise outside the direct receiving range of the central computer are received by the central computer. In an example, the mobile device described herein can act as a mobile local receiver and acquire the data from the field devices, e.g., steam traps. The mobile device can transmit the field device data to the central monitor, e.g., a central computer, once the mobile device is at a location where a quality communication signal is available.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A steam monitoring system comprising:
   a central monitor to receive and process data from a plurality of steam field devices connected to a steam line at an enterprise; and
   a plurality of mobile devices in communication with the central monitor and to display the processed data from the central monitor regarding the steam field devices associated with the plurality of mobile devices,
   wherein the plurality of steam devices are divided into a plurality of nests, each of the nests associated with an environment and said each of the nests assigned to a respective one of the plurality of mobile devices,
   wherein the steam field devices include at least a steam trap,
   wherein the central monitor applies rules to the processed data and outputs settings instructions for at least one of the plurality of steam field devices along with a representative visual indicator for status of the at least one of the plurality of steam field devices for display on at least one of the plurality of mobile devices,
   wherein the central monitor issues control signals to the at least one of the mobile devices to download a plurality of predetermined efficiency thresholds of the at least one of the steam field devices including a first threshold indicating malfunction requiring urgent attention and a second threshold that is higher than the first threshold and indicates non-urgent maintenance is needed, and
   wherein an efficiency reading over the second threshold results in the central monitor scheduling the at least one of the plurality of steam field devices for more frequent maintenance checks.

2. The system of claim 1, wherein the at least one mobile device includes a history of the steam field devices downloaded from the central monitor.

3. The system of claim 1, wherein the at least one mobile device uses a first gesture to select a steam field device from the plurality of steam field devices loaded into the at least one of the mobile devices, a second gesture, which is different from the first gesture, to receive a first data regarding the selected steam field device, and a third gesture, which is different from the first gesture and the second gesture, to add new steam field devices to an enterprise location, and wherein the at least one of the mobile devices uploads new steam field device information related to the received first data triggered by the second gesture, a new steam field device of the new steam field devices or both to the central monitor, wherein at least one of the first gesture and the second gesture is not a single tap on a graphical user interface of the at least one of the mobile devices.

4. The system of claim 1, wherein the central monitor further issues the control signals to the steam field devices to set operational parameters of the steam field devices.

5. The system of claim 1, wherein the central monitor further issues the control signals to the at least one of the mobile devices to download a set of operational parameters of the at least one of the steam field devices of an assigned nest before the at least one of the mobile devices enters the environment associated with said each of the nests.

6. The system of claim 1, wherein the central monitor further calculates an efficiency value for ft the at least one of the steam field devices using the data from the steam field devices and displays an efficiency history of the at least one of the steam field devices.

7. The system of claim 6, wherein the central monitor further displays the visual indicator of a current efficiency of the at least one of the plurality of steam field devices.

8. The system of claim 7, wherein the central monitor further transmits the processed data for the visual indicator to the at least one of the mobile devices to display a mobile device indicator on a graphical user interface.

9. The system of claim 1, wherein the central monitor further,
   calculates an efficiency value for a group of the steam field devices using the data from the steam field devices and displays an efficiency history of the group of the steam field devices; and
   displays the visual indicator of a current efficiency of the group of the steam field devices or transmits the data for the visual indicator to the at least one of the mobile devices to display a mobile device indicator on a graphical user interface for the group of the steam field devices.

10. The system of claim 1, wherein the central monitor further downloads the data for a first steam field device of the steam field devices to the at least one of the mobile devices when the at least one of the mobile devices is scheduled to review the first steam field device, wherein the data of the first steam field device includes historical operational data, an image of the first steam field device, and a status indicator.

11. The system of claim 1, wherein the at least one of the mobile devices includes an inspection schedule for the plurality of steam field devices in a group of the steam field devices, and wherein the central monitor further downloads and stores the data for each of the plurality of steam field devices in the group of the steam field devices to the at least one of the mobile devices, the stored data includes images of each of the steam field devices in the group of the steam field devices, location of each of steam field devices in the group of the steam field devices, a route to inspect the plurality of steam field devices in the group of the steam field devices, and a determined operational state of each of the steam field devices in the group of the steam field devices.

12. The system of claim 1, wherein the central monitor further downloads a virtual map of the steam field devices to be reviewed using the at least one of the plurality of mobile devices, wherein the data for the steam field devices along a route to be followed by the at least one of the plurality of mobile devices is stored in the at least one of the plurality of mobile devices, and a graphical user interface of the at least one of the plurality of mobile devices displays select ones of the steam field devices as selected through the graphical user interface.

13. The system of claim 1, wherein the plurality of predetermined efficiency thresholds includes an overall efficiency of one of the nests having the plurality of steam field devices.

14. A hot water or steam monitoring system comprising:
a central monitor to receive and process data from hot water field devices or steam field devices;
a plurality of mobile devices in communication with the central monitor when having a communication channel with the central monitor, wherein the mobile devices are configured to update the data regarding the hot water field devices or steam field devices in a hot water or steam processing environment, respectively, the mobile devices providing a graphical user interface with the data regarding the hot water field devices or steam field devices and allow for the update of the data on a device-by-device basis in one mobile device of the mobile devices, even with the communication channel between the one mobile device and the central monitor being interrupted, and wherein the one mobile device is configured to locally save the data when the communication channel is interrupted and store the saved data until the communication is no longer interrupted and the central monitor has downloaded the stored saved data from the one mobile device;
wherein the data includes a plurality of predetermined efficiency thresholds of at least one of the hot water field devices and steam field devices including a first threshold indicating malfunction requiring urgent attention and a second threshold that is higher than the first threshold and indicates non-urgent maintenance is needed, and
wherein the data further includes a predetermined efficiency threshold of an overall efficiency of a nest having the hot water field devices or steam field devices.

15. The system of claim 14, wherein the communication between the central monitor and the mobile devices is a wireless communication.

16. The system of claim 14, wherein the central monitor is configured to send a past status of the hot water field devices or steam field devices to an assigned mobile device of the plurality of mobile devices, and
wherein the assigned mobile device receives the past status of the hot water field devices or steam field devices before the assigned mobile device is to be used to inspect the hot water field devices or steam field devices assigned to the assigned mobile device;
wherein the graphical user interface displays the past status for the assigned hot water field devices or steam field devices and allows a user to traverse the data regarding a group of the hot water field devices or steam field devices and an individual selected field device from the group of the hot water field devices or steam field devices.

17. The system of claim 14, wherein the central monitor downloads the data for at least one field device of the hot water field devices or steam field devices to the one mobile device when the one mobile device is scheduled to review the at least one field device of the hot water field devices or steam field devices, wherein the data of the at least one field device of the hot water field devices or steam field devices includes historical operational data, an image of the at least one first field device of the hot water field devices or steam field devices, and a status indicator.

18. The system of claim 14, wherein an efficiency reading over the second threshold results in the central monitor scheduling at least one of the plurality of hot water field devices and steam field devices in the nest for more frequent maintenance checks.

* * * * *